United States Patent
Chu et al.

(10) Patent No.: US 12,081,906 B2
(45) Date of Patent: Sep. 3, 2024

(54) PARALLEL PROCESSING OF DIGITAL IMAGES

(71) Applicant: Logitech Europe S.A., Lausanne (CH)

(72) Inventors: Joseph Yao-Hua Chu, Los Gatos, CA (US); Kristopher Glenn Perry, Camas, WA (US); Yu Loh, Fremont, CA (US); Fu Han Chao, Changhua (TW); Oleg Ostap, Camas, WA (US); Richard John Campbell, Camas, WA (US); Anurag Bansal, Portland, OR (US); Miguel Angel Maestre Trueba, Portland, OR (US)

(73) Assignee: LOGITECH EUROPE S.A., Lausanne (CH)

( * ) Notice: Subject to any disclaimer, the term of this patent is extended or adjusted under 35 U.S.C. 154(b) by 225 days.

(21) Appl. No.: 17/870,724

(22) Filed: Jul. 21, 2022

(65) Prior Publication Data
US 2024/0031529 A1    Jan. 25, 2024

(51) Int. Cl.
*H04N 7/15* (2006.01)
*H04N 7/14* (2006.01)

(52) U.S. Cl.
CPC .............. *H04N 7/15* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 9,270,941 B1* | 2/2016 | Lavelle | H04N 23/695 |
| 10,582,125 B1* | 3/2020 | Roessler | H04N 23/45 |
| 10,991,108 B2 | 4/2021 | Schnittman et al. | |
| 2004/0263636 A1 | 12/2004 | Cutler | |
| 2008/0218582 A1 | 9/2008 | Buckler | |
| 2009/0219387 A1 | 9/2009 | Marman | |
| 2013/0271560 A1 | 10/2013 | Diao | |
| 2016/0275354 A1* | 9/2016 | Andaló | H04N 19/17 |
| 2016/0292884 A1* | 10/2016 | Schnittman | G06T 3/4038 |
| 2017/0099461 A1* | 4/2017 | Nimri | H04N 7/152 |
| 2019/0251362 A1* | 8/2019 | Meisser | H04N 7/147 |
| 2020/0099889 A1* | 3/2020 | Sugihara | H04N 7/147 |
| 2022/0294974 A1* | 9/2022 | Gong | H04N 23/90 |

* cited by examiner

*Primary Examiner* — Quoc D Tran
(74) *Attorney, Agent, or Firm* — Patterson & Sheridan LLP

(57) ABSTRACT

A system and method for providing video conferencing are described herein. Original video streams from one or more cameras are sampled to form downscaled versions of the video stream. The downscaled version is analyzed to find regions of interest and generate metadata describing aspects of the regions of interest, including a region that includes a preferred speaker and the best view of each participant present together in the video conference. Cropping instructions are generated from the metadata, and portions of the original video stream are removed to form a set of presentation views for each participant, including the preferred speaker. The set of presentation views is stitched together to form a composite display for each participant viewing the stream remotely.

20 Claims, 14 Drawing Sheets

PARALLEL PROCESSING OF DIGITAL IMAGES

BACKGROUND

Field

Embodiments of the present disclosure are generally directed to video conferencing systems and related video conferencing methods. More specifically, embodiments relate to a system and method for generating and delivering a video stream containing desired regions of a video conferencing environment to a local and/or a remote location.

Description of the Related Art

The recent increase in remote work has highlighted the need for improvements in video conferencing. In a completely remote video conferencing environment, multiple remote users interact with a central video conferencing graphical user interface (GUI) through their own individual cameras. These individual camera environments typically create a standard portrait view of each person. Occasionally, the video conferencing environment consists of a hybrid setup with multiple remote people and one or more people in a (non-remote) conference room. Generally, most conference rooms have a front-of-room camera that captures the entire conference room and all of the people present. However, in certain conference room seating situations, it is nearly impossible for a front-of-room camera to capture the front of each speaker. For example, in scenarios where the conference room consists of a circular table, with people situated in a circular setup, the front-of-room camera only captures a front-facing profile view of the people facing the camera. Furthermore, in this scenario, the front-of-room camera only captures a side profile of the users sitting perpendicularly to a full field of view (FFOV) of the front-of-room camera.

Accordingly, designers of video-conferencing systems seek to provide desirably oriented portrait views of people in a conference room without altering the seating arrangement. One solution is to use a wide-angle camera to capture more of the conference room. However, the larger FFOV also captures a large amount of unnecessary aspects of the room (windows, walls etc.). Another solution is to use multiple cameras. However, multiple camera configurations struggle to display a profile view of each person, as no one camera FFOV can capture a perfect portrait view of each person from every angle. Furthermore, traditional multi-camera front-of-room video conferencing systems switch between the multiple cameras, only providing a single and often incomplete view based on one camera angle or another, but not both. These multi-camera front-of-room video conferencing systems cannot blend the video streams to incorporate an FFOV of all of the cameras in the system. Moreover, as the number of cameras and input video streams increases, there is an increased amount of strain on the processing components of the image system processor resulting in a need to decrease video picture quality to avoid latency issues. An additional deficiency with multiple cameras is that each camera may have a different delay leading to the audio and video of a particular camera being out of sync or the video streams of the cameras being out of sync with each other. Maintaining synchronization is possible by adding delays, but the delays make the already unacceptable latencies worse.

If the latency in the delivery of images and audio data during a video conference is too large, the ability of a video conferencing system to effectively carry out the video conference is affected since the lag in the presentation to a remote viewer caused by the large latency is annoying to the remote viewer. Also, with a video conferencing participant's typical desire to deliver and present high-quality videos, many manufacturers have pushed to use higher and higher resolution cameras. Multiple high-resolution cameras often increase the lag in delivering the combined video stream data to a remote location.

There is a need for a multi-camera video conferencing system and video conferencing method that allows each speaker to be viewed in a forward facing manner regardless of their seating or speaking position, and also a need for a multi-camera video conferencing system that has a low latency, while also maintaining or providing high-quality images to one or more video conference locations.

SUMMARY

Embodiments provide a method for video conferencing. The method includes processing a video stream received from each of a plurality of sensors, where each video stream includes a first version of video data having a first resolution. Processing the video stream includes sampling the first version of the video data to form a second version of the video data, where the second version of the video data has a second resolution that is less than the first resolution, determining one or more regions of interest within the second version of the video data, and generating metadata for each of the one or more regions of interest. The method further includes generating cropping instructions for each of the one or more regions of interest based on the metadata, removing portions of the first version of the video data based on the cropping instructions, and generating a composite display that includes portions of the first version of the video data remaining after removing portions from the first version of video data.

Embodiments of the disclosure provide a method of video conferencing that includes processing a video stream received from each of a plurality of sensors, wherein each video stream includes a first version of video data having a first resolution, and processing the video stream comprises: sampling the first version of the video data to form a second version of the video data, wherein the second version of the video data has a second resolution that is less than the first resolution; determining one or more regions of interest within the second version of the video data, and generating metadata for each of the one or more regions of interest; generating cropping instructions for each of the one or more regions of interest based on the metadata; removing portions of the first version of the video data based on the cropping instructions; and generating a composite display that includes portions of the first version of the video data remaining after removing portions from the first version of video data.

Embodiments of the disclosure provide a method of video conferencing that includes: a plurality of sensors, an image signal processor, a computer vision processor, a virtual cinematographer, and a video composer. The plurality of sensors are each configured to generate a video stream that comprises a first version of video data that has a first resolution. The image signal processor is configured to downscale the first version of the video data to form a second version of the video data that has a second resolution that is less than the first resolution. The computer vision processor is configured to determine two or more regions of interest and generate metadata for each of the two or more regions of interest using the second version of the video data. The virtual cinematographer is configured to: create a ranking of the determined two or more regions of interest based on the metadata; generate crop instructions for each of the two or more regions of interest based on the metadata and the ranking of each of the one or more regions of interest; and crop at least two or more portions of the first version of the video data to form at least two or more presentation regions of interest. The video composer is configured to compile the at least two or more presentation regions of interest.

Embodiments of the disclosure provide a method of video conferencing that includes processing a video stream received from each of a plurality of sensors, wherein each video stream includes a first version of video data having a first resolution, and processing the video stream comprises: a) sampling the first version of the video data to form a second version of the video data, wherein the second version of the video data has a second resolution that is less than the first resolution; b) determining one or more regions of interest within the second version of the video data, c) generating metadata for each of the one or more regions of interest; d) selecting one or more regions of interest as best by ranking each of the one or more regions of interest in the second version of the video data based on the metadata; e) generating cropping instructions for each of the one or more regions of interest selected as best based on the metadata; f) cropping at least two or more portions of video data from the first versions of the video to form two or more presentation regions of interest based on the cropping instructions; and g) generating a composite scene video data that includes the two or more presentation regions of interest.

Embodiments also provide a system performing one or more aspects of the above method.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. However, it is to be noted that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
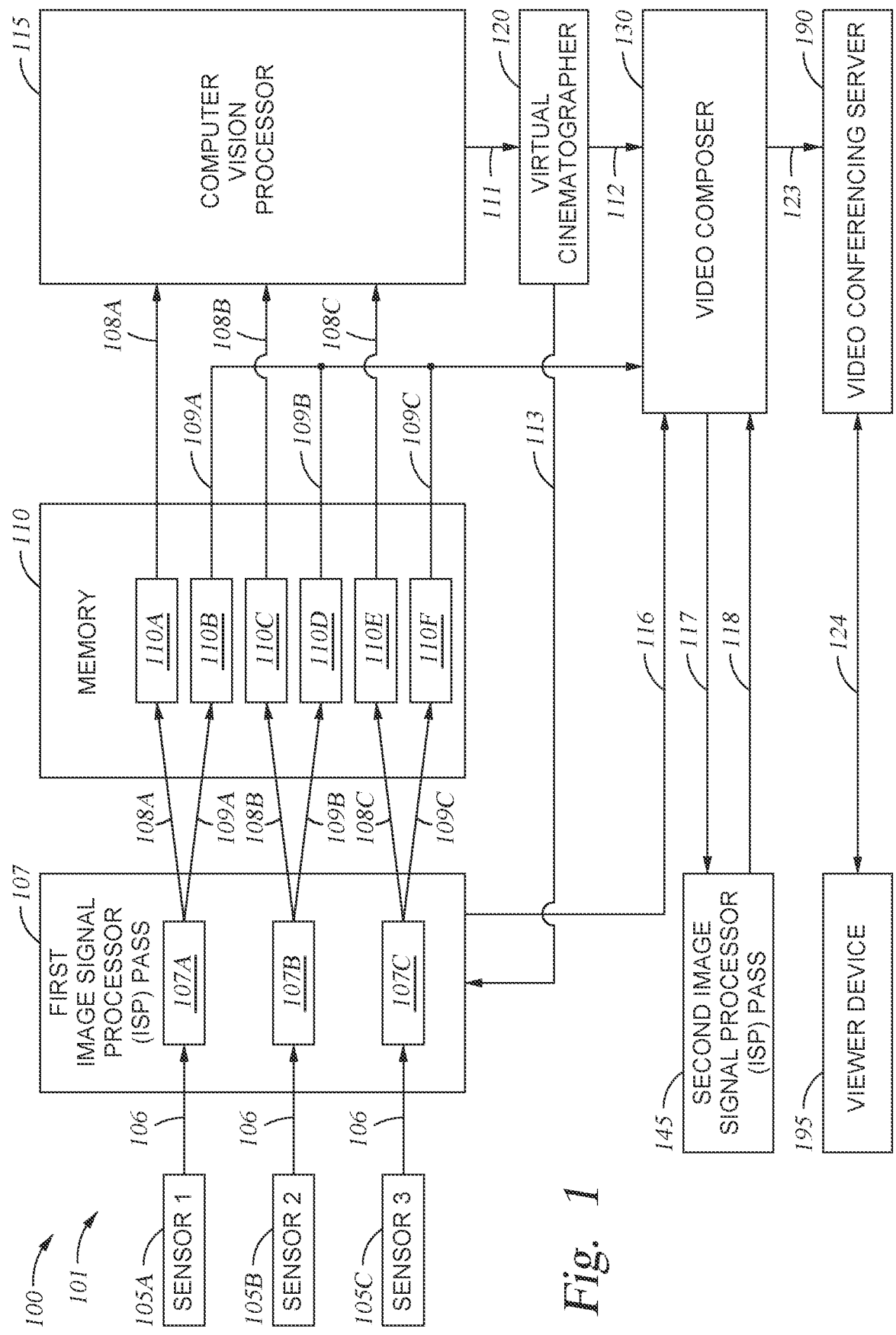
FIG. 1 depicts a block diagram of a system for delivering video content to one or more internal and/or external locations using a video-conferencing system, according to one embodiment.

Numerous specific details are set forth in the following description to provide a more thorough understanding of the embodiments of the present disclosure. However, it will be apparent to one of skill in the art that one or more of the embodiments of the present disclosure may be practiced without one or more of these specific details. In other instances, well-known features have not been described in order to avoid obscuring aspects of the present disclosure.

Traditional video conferencing systems typically include one camera placed at the front of the room to capture a full field of view (FFOV) of the entire conference room. A single front-of-room camera can generally capture all of the persons in the FFOV but can often not provide an optimal view of each participant in the room. In response, some video-conferencing systems have added a second front-of-room camera. The problem with a second front-of-room camera is that the front-of-room cameras are typically unable to capture an optimal view of the people in the room since their viewpoint is limited to a position at the front of the room. In addition, when typical multi-camera front-of-room video conferencing systems desire only one preferable view of a speaker, they are forced to repeatedly switch between a first camera and a second camera, providing a single view based on the first camera angle or the second camera angle. In addition, these multi-camera front-of-room video conferencing systems cannot blend the video stream to incorporate at least portions of an FFOV of the first camera and second camera. Thus, a traditional multi-camera video conferencing system's controller's decision results solely in cycling between the views provided by the one or more cameras within the video conferencing environment.

Cycling between cameras becomes especially problematic when many people are in the FFOV. The controller must decide which camera shows the most optimal view. Thus, the final product is not an optimized video of both people but a one camera view that is slightly better than the other. This problem is compounded as more and more people join the video conference environment. Furthermore, selecting only one FFOV of one camera can exclude other potentially more beneficial camera views for a viewer. Thus, there is a need for a multi-camera system that can provide an optimal view of participants in the conference without having to cycle through video streams.

As briefly discussed above, because latency in the delivery of images and audio data during a video conference affects the ability of the video conferencing system to effectively carry out the video conference without annoying its participants due to a lag in the presentation of the images and audio data relative to the video conference going on at a viewer's location, there is a need for a system that has a desirable low latency, while also maintaining or providing high quality images to one or more video conference locations. Typically, latencies exceeding a 160 millisecond (ms) delay lead to noticeable and undesirable delays in the delivery and presentation of the images and audio data; thus, latency delays less than 130 ms are preferred. As is discussed further below, embodiments of the disclosure provided herein also provide a system and methods of delivering high-resolution images with low latency by at least defining one or more regions of interest (ROI) within the images found within a video stream, extracting the ROIs from a high-resolution stream of images, and transmitting the extracted ROIs to a desired location. The system and methods provided herein thus reduce the amount of unnecessary information that is provided from the video conferencing system to the "pipe-line" that is delivering the video images and audio data to other video conferencing locations, and allow the multiple ROIs to be transferred through a "pipe-line," each having a high resolution and/or image quality.

The video conferencing system 100 described herein is generally able to combine and alter a video stream generated by an image signal processor from a video generating device (e.g., camera) and thus, continuously use any advantageous camera angle from any camera in the multi-camera video system. Furthermore, because the image signal processing system gathers the video streams from the cameras and combines them, the system can actively combine a defined ROI that contains a first portion of one person from a first camera FFOV with a defined ROI that contains a second portion of the same person from a second camera FFOV. This combining is especially beneficial in situations where the most optimal view of the person may be in a partial blind spot for either the first or second camera or may be in a position where the best view for the person is in a position where the FFOV of the first camera overlaps with the FFOV of the second camera, and selecting only one FFOV from one camera would not be the optimal view.

FIG. 1 depicts a block diagram of a system for delivering video content to one or more internal and/or external locations using a video-conferencing system, in one embodiment. The image processing system 101 includes a plurality of sensors 105A-105C, such as cameras, a first image signal processor (ISP) pass 107, a memory 110, a computer vision processor (CVP) 115, a virtual cinematographer (VCT) 120, a video composer (VCMP) 130 and a second ISP pass 145.

The plurality of sensors 105A-105C includes a first sensor 105A, a second sensor 105B, and a third sensor 105C, which, in some embodiments, are high-resolution cameras, such as cameras that have a resolution greater than 8 megapixels (MPs) or greater than 12 MP, or greater than 16 MP, or greater than 20 MP, or even greater than MP that are capable of delivering video at at least Full HD (1080 p) video resolution. In some embodiments, the cameras are capable of delivering video at a 2K video resolution, or UHD (2160 p) video resolution, or DCI 4K (i.e., 4K) video resolution, or 8K or greater video resolution. The terms "camera" and "sensor" are generally used interchangeably throughout the disclosure provided herein, and neither term is intended to be limiting as to the scope of the disclosure provided herein since, in either case, these terms are intended to generally describe a device that is at least able to generate a stream of visual images (e.g., frames) based on a field-of-view of one or more optical components (e.g., lenses), and an image sensor (e.g., CCD, CMOS sensor, etc.) disposed within the "camera" or "sensor." While FIG. 1 and most of the disclosure below discuss the use of three or more sensors, this configuration is not intended to be limiting as to the scope of the disclosure provided herein since, in some configurations, a video-conferencing system can include more than three cameras or less than three cameras and still benefit from the disclosure provided herein. In one example, the first, second, and third sensors are cameras, each of which can generate a video stream that includes video frames. In another example, the first sensor includes a first and a second camera, the second sensor is a third camera, and the third sensor is a fourth camera, each of which can generate a video stream that includes video frames and detects and transmits audio data.

The plurality of sensors 105A-105C captures a video stream based on a full field-of-view (FFOV) of the sensor. Typically, the FFOV environment includes one or more subjects, a foreground, a background, and a surrounding area. In some embodiments, a video stream includes video frames and audio data (e.g., audio packets). The video frames, and optional audio data, are hereafter referred to generally as "video data." In some embodiments, at least the video stream portion of the video data is shared across all nodes within the system.

The first ISP pass 107 receives the video data 106 captured by the plurality of sensors 105A-105C. In some configurations, the first ISP pass 107 includes a plurality of individual ISP-passes 107A-107C, each associated with a respective sensor 105A-105C. The first ISP pass 107 receives the video data 106 from a sensor and resizes the FFOV video data by downscaling the video data gathered by each sensor 105A-105C from a higher resolution (e.g., 4 k) to a lower resolution (e.g., 720p).

The first ISP pass 107 processes the video data from the downscaled version and then sends a version of the video data, referred to herein as the downscaled video data, to a memory location 110A, 110C, or 110E via a path 108A. The first ISP pass 107 can downscale the video data to any useful megapixel (MP) value to allow for the rapid analysis of the downscaled data by the CVP 115. In one embodiment, the video data is downscaled to a resolution of about 1 megapixel (MP).

The memory, such as memory 110A, 110C, and 110E, stores the processed video data from first ISP pass 107. In some embodiments, the memory, such as memory 110G, 110C, and 110E, stores unprocessed (i.e., original video data) in memory locations 110G, 110D, and 110F via paths 109A, 109B, 109C. In addition, in some embodiments, the memory stores regions of interest (ROIs) for later processing by second ISP Pass 145.

Computer vision processor (CVP) 115 processes the downscaled video data, which is made available to the virtual cinematographer (VCT) 120.

The CVP 115 gathers video data from memory 110. The CVP 115 performs three functions. It functions as a classifier to determine whether or not the video data contains one or more ROIs. It generates metadata associated with each ROI, such as metadata relating to a person within the video conferencing environment and/or ROI within which the person is captured. Finally, it serves to determine "who is who."

The CVP 115 defines one or more ROI within the frames of the video data. The low-resolution video data decreases processing latency as only a small portion of the video data is passed through and analyzed by the VCT 120. Furthermore, as further explained in relation to FIGS. 7, 8, 9, and 10, as the video-conferencing system switches between sensor feeds, the likelihood of video feed interruption or slowdown increases as more and more processing power is required to continuously determine which video data provides the desired ROI (e.g., "best view") of each person 402-408 in FIGS. 4B, 7 and 9.

The metadata includes one or more video stream characteristics, such as date, time stamp information, sensor 105 information, attributes of one or more people in the ROI, video attributes, and other useful video conferencing information. The classifier constructs a region of interest (ROI) that includes at least a portion of one or more people to determine whether or not the video data captures one or more people. In some embodiments, each speaker within the video conferencing environment is assigned his/her own ROI. The ROI is defined by a bounding box. In one configuration, the bounding box is created to include the subject's face and a portion of their body. However, the bounding box of the ROI can be any arbitrary size and location within the FFOV of any of the one or more cameras.

The CVP 115 also generates metadata that includes a plurality of characteristics for portions of each ROI. The characteristics can further include a color histogram, vertical motion history, history of speech, polar coordinate history of attributes in the ROI, and person's face direction history. The characteristics in one configuration include head segmentation and head pose estimation. Each characteristic is assigned a value by the virtual cinematographer and ranked to determine the "best view" of each person and/or speaker. Here, the CVP 115 generates metadata that includes characteristic information concurrently with creating the metadata that includes the bounding box and its instructions. In another configuration, the CVP 115 sequentially generates the metadata that includes characteristic information after creating the metadata that includes the bounding box instructions. The CVP 115 sends the metadata to a VCT 120.

Each ROI is tagged with a unique ID tag, allowing the CVP 115 to track inferences of specific video characteristics for each person. For example, the CVP 115 makes a plurality of ID tags to identify a first ROI for a first person, a second ROI for a second person from a first camera, a third ROI for a third person, a fourth ROI for a fourth person, and a fifth ROI for a fifth person from a second camera.

Because the CVP 115 is shared across all nodes when there is a single device, multiple sensors, and one SoC within the video conferencing system 100, each subject is individually evaluated at the virtual cinematographer 120 irrespective of the origin of the video stream. This evaluation is especially valuable in configurations where a first portion of an ROI from a first camera FFOV is stitched with a second portion of an ROI from a second camera FFOV to create a full ROI of a person. By not requiring the CVP 115 to be individually associated with each camera, the CVP 115 can individually determine ROI regardless of the origin of the video stream.

The VCT 120 operates on the ROIs 203 and the ROI metadata to generate a ranking on which the best view is decided. In one embodiment, the "best view" is formed using artificial intelligence (AI) software running on the video conferencing system 100. The best view is based on (1) who is speaking, (2) the camera people are facing, and (3) the camera people are closest to (using polar coordinates). The person speaking identifies candidate persons for streaming. The camera people are facing gives information about the camera that best captures the person's face and is more important than the camera people are closest to, which gives information about the camera with the best image quality. If there are multiple cameras that best capture the person's face, the camera with the higher quality image is selected. In addition, the items such as a person's face size, face angle, color histogram, vertical motion history, history of speech, polar coordinate history, and face direction history, all of which are stored in memory, can be used to help select the best view. Once the virtual cinematographer (VCT) determines the "best view" of each ROI, the VCT 120 generates cropping instructions based on the "best view" as determined by software running therein (e.g., artificial intelligence (AI) software).

Video composer (VCMP) 130 executes the crop instruction on the original video data to remove regions in the FFOV outside the defined bounding box or boxes. Removing irrelevant video data reduces the amount of video data that has to be processed by VCMP 130 and any downstream processor such as ISP-pass2. The instructions for creating an ROI and removing video data outside the bounding box are hereafter referred to as "bounding box instructions."

The video composer (VCMP) 130 receives the cropping instructions for the best views of the ROIs where multiple re-sizers in conjunction with the hardware-accelerated video composer 130 create presentation ROIs. The original video data outside of the best view ROI is removed and discarded. Removing unused original video data increases the efficiency of the video composer 130 by requiring the video composer 130 to generate only one ROI per person. In some cases, an ROI may be referred to as a "people frame" since the ROI primarily contains portions of a person within the video conference environment versus ROIs that contain portions of other areas of interest (e.g., whiteboard surfaces).

In one configuration, the second ISP-pass 145 uses a plug-in re-sizer (for example, software that upscales the video data to a higher resolution). In one configuration, the second ISP pass 145 resizes the person frame 203 by increasing the zoom level of the person frame 203 while maintaining quality within an allotted picture quality (e.g., resolution) threshold value that is stored in memory. In some embodiments, the output of the second ISP pass is sent to memory, skipping the need for SVPP or CPU, thereby reducing latency.

VCMP 130, with the aid of SVPP and possibly a GPU, merges individual ROIs into a "single composite frame" (graphical user interface (GUI). As previously mentioned, downscaling original video data reduces the latency in creating individual ROIs. In some embodiments, the composite frame is handled, without using additional hardware-accelerated elements, by allocating memory of the same size as the outbound video stream (1920×1080) and writing the individual ROIs to the memory.

FIGS. 2A-2G depict a flow of operations for delivering video content to one or more internal and/or external locations, according to one embodiment.

Figure 2A:
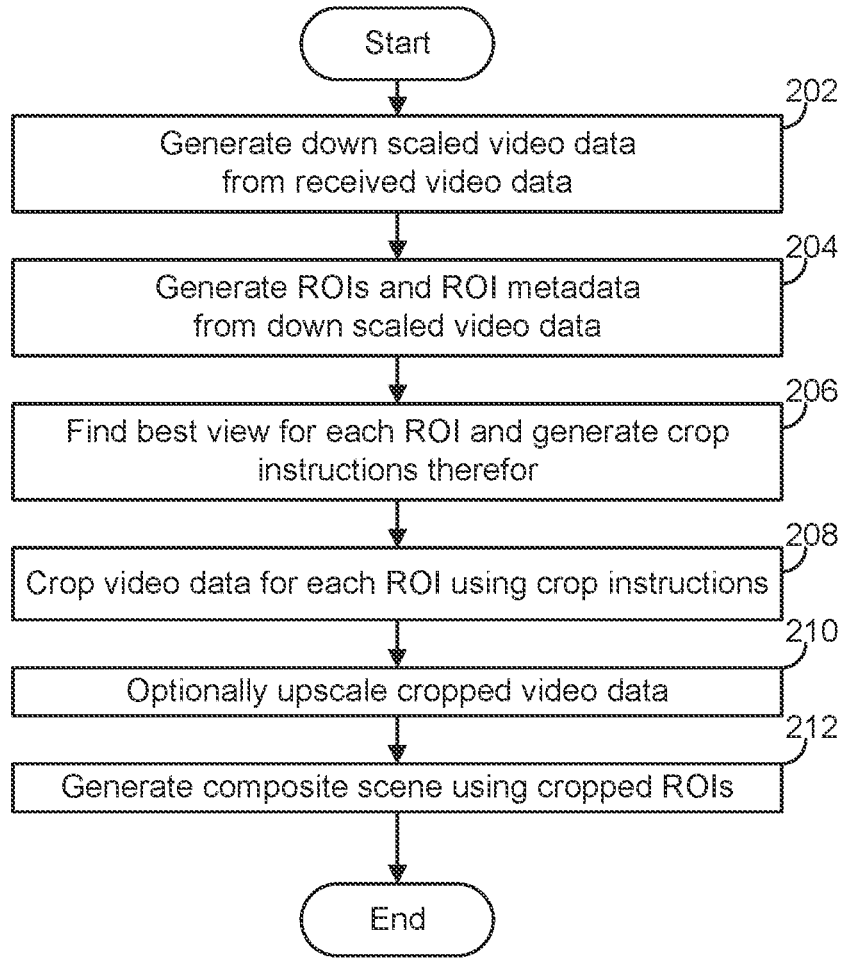
FIGS. 2A-2G depict a flow of operations for delivering video content to one or more internal and/or external locations, according to one embodiment.
Figure 2B:
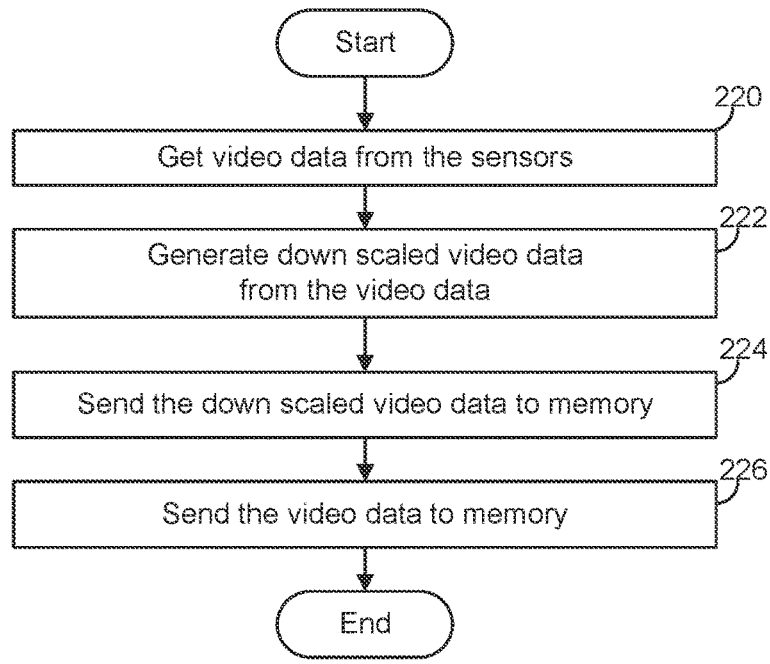
Figure 2C:
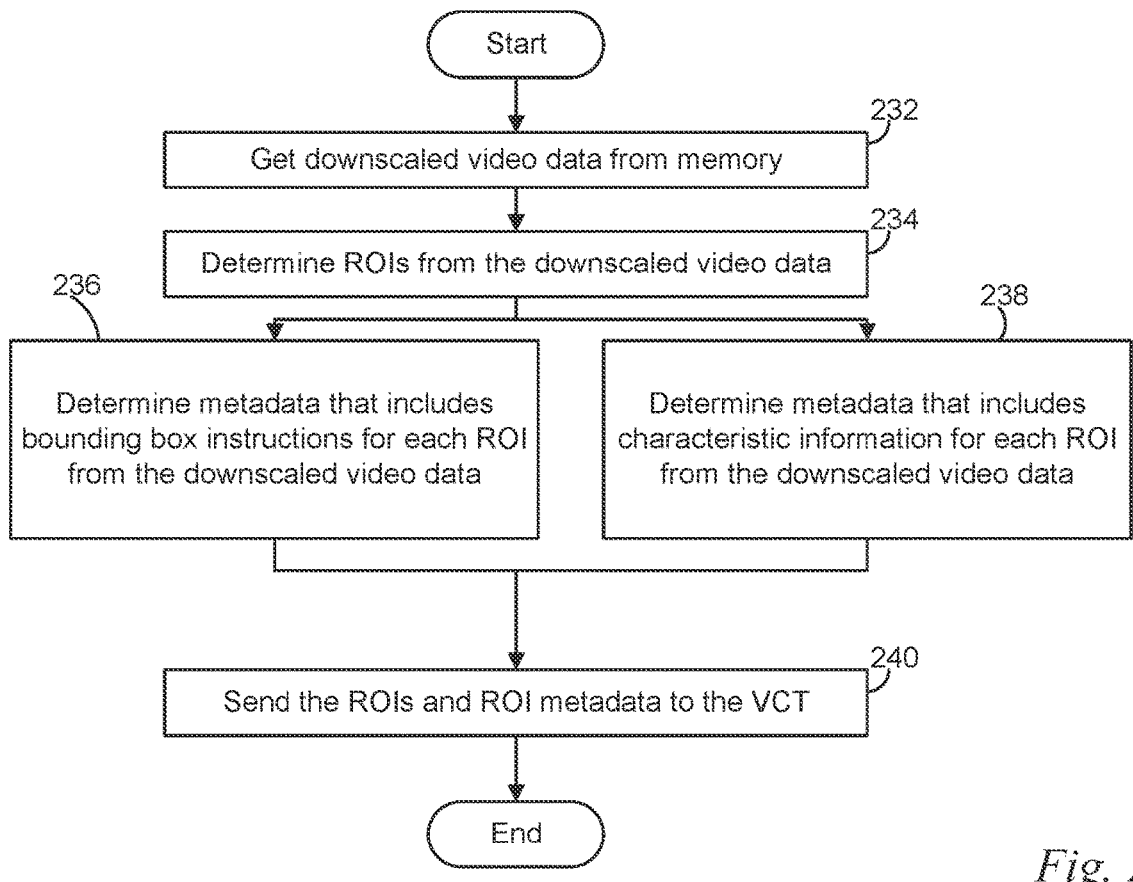
Figure 2D:
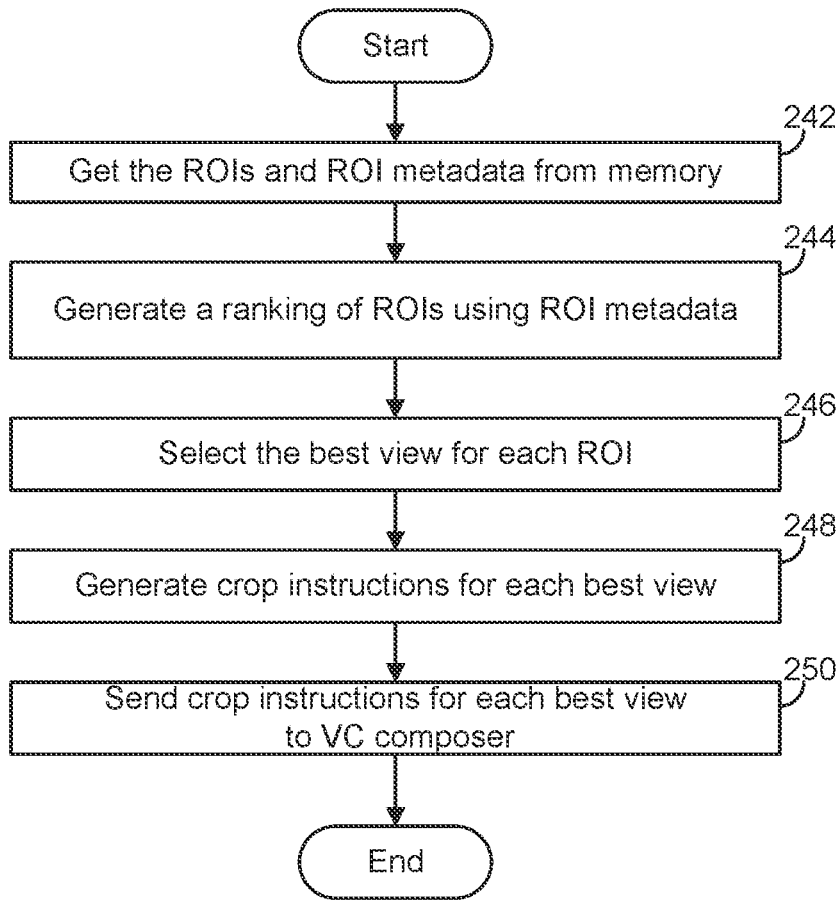
Figure 2E:
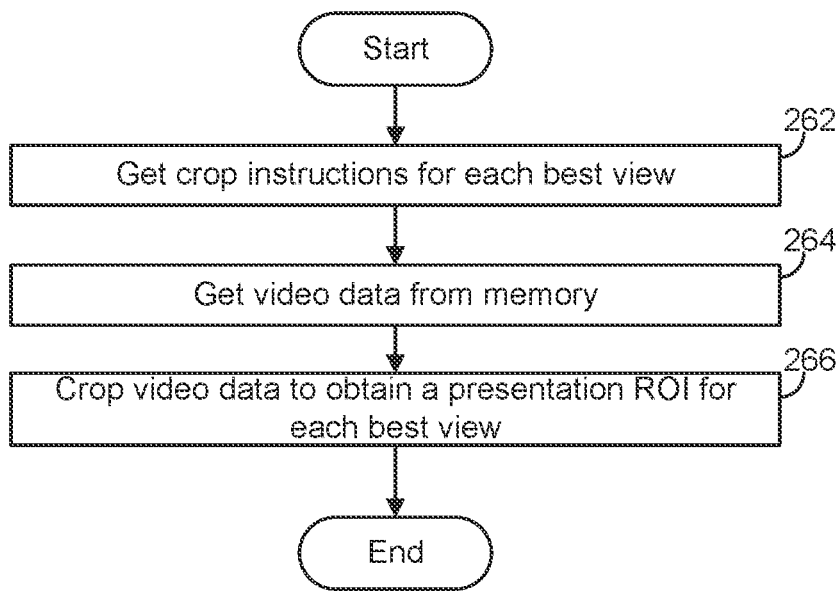
Figure 2F:
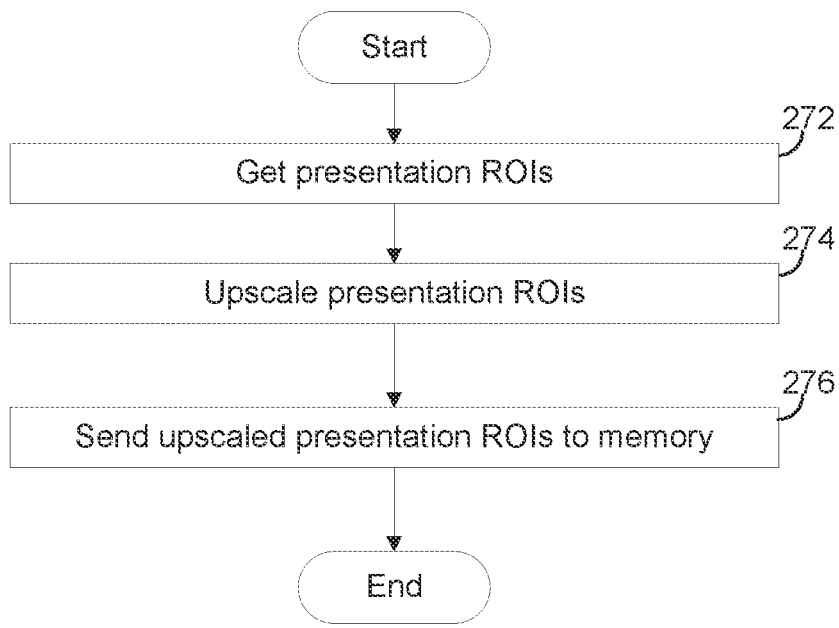
Figure 2G:
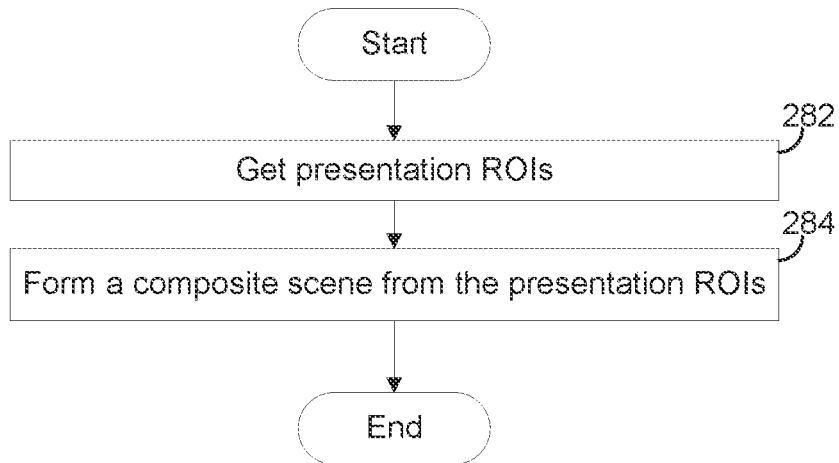

FIG. 2A depicts the overall flow of operations. In step 202, system 100 receives video from the sensors and downscales the received data. FIG. 2B depicts step 202 in more detail. In step 204, system 100 generates ROIs and metadata for each ROI from the downscaled version of the video data. FIG. 2C depicts step 204 in more detail. In step 206, system 100 finds the best view for each ROI and generates crop instruction for that best view. FIG. 2D depicts step 206 in more detail. In step 208, system 100 crops the original video data using the crop instructions of the best view. FIG. 2E depicts step 208 in more detail. In step 210, system 100 optionally upscales the cropped video data. FIG. 2F depicts step 210 in more detail. In step 212, system 100 generates a composite scene using the cropped original video data. FIG. 2G depicts step 212 in more detail.

FIG. 2B depicts the flow of operations for downscaling the received data, according to one embodiment. In step 220, system 100 gets the original video data at first ISP pass 107 and stores the original video data in memory in step 226. As previously mentioned, the original video data can include video frames and optional audio packets. In step 222, system 100 generates downscaled video data from the original video data. In step 224, the downscaled video data is stored in memory. In one embodiment, storing the original video data in step 226 and then downscaling the original video data in step 222 are performed concurrently, and associated metadata that is received by one of the ISP-passes 107A-107C from one of the sensors 105A-105C, respectively.

FIG. 2C depicts the flow of operations for generating the ROIs and ROI metadata, according to one embodiment. CVP 115 retrieves the downscaled video data from memory (path 108B) in step 232. In step 234, CVP 115 determines a region of interest (ROI), and in step 236 generates metadata that includes bounding box instructions for the ROI. In step 238, CVP 115 determines metadata that includes characteristic information for the ROI. In step 240, CVP 115 sends the generated metadata to the VCT 120. In some embodiments, step 236 can be performed concurrently with portions of step 238. In some embodiments, step 232 can be performed concurrently with steps 236 and 238 or portions thereof. In some embodiments, CVP 115 includes separate CVPs, one for each memory area in which downscaled video data of a sensor is stored.

During steps 234, 236 and 238, the CVP 115 uses the downscaled video data stored in the one or more first memory locations. Using only some pixels allows the CVP 115 to gather information about original video data 109 without having to process every pixel increases the processing speed of this activity by decreasing the computing demands of the processing device (e.g., processor within a SoC). Using the downscaled video data, the CVP 115 acts as a classifier and can determine whether or not one or more people are in a video frame. The classifier includes one or more algorithms that are configured to review and analyze the sampled data found in the video frames to detect whether a person is present in the video data. The classifier has rules and/or software instructions stored therein that are able to detect and isolate a person from all of the other elements (e.g., chairs, tables, painting, windows etc.) in the video data.

Specifically, during step 234, the CVP 115 determines one or more ROIs using the downscaled video data retrieved from memory in step 232. In one example, to determine whether or not the video data contains an ROI, such as a region including one or more people, the CVP 115 typically uses a classifier (e.g., face detection application programming interface (API)) to determine the face and/or upper body of each person. Generally, face detection APIs recognize facial features in video data through face mapping software. Face mapping software superimposes a grid onto the speaker to measure contours (e.g., biometrics) associated with facial features and can be used to train neural networks to automatically detect similar facial features in the future. In another example, the classifier is able to detect or isolate a person by detecting changes in their position or portion thereof, their shape or outline relative to a background, or other useful metric.

Once the CVP 115 determines that one or more people are present in the video data, the CVP 115 constructs a region-of-interest (ROI) 203 for each person around at least their face and upper body. In some embodiments, each speaker can have his/her own ROI assigned to them. The ROI is defined by a bounding box with a desired size defined by one or more bounding box attributes stored in memory. In one configuration, the bounding box is created to include the subject's face and portions of their body. The edges and/or corners of the bounding box include X coordinates and Y coordinates (e.g., pixel coordinates) and are determined using offsets defined by the attributes stored in memory. The amount of one or more offsets in any direction can be determined based on the resolution of the video data that is to be later cropped, such as adjusted so that a controlled number of pixels are found within one or more ROIs. The bounding box coordinates as part of the metadata generated by the CVP 115 are then sent in step 240 to VCT 120 as bounding box instructions. The bounding box instructions can include data relating to the portion of the video data to be processed using the bounding box. The bounding box instructions thus include information relating to at least one bounding box that is used to define one or more ROIs.

While concurrently performing step 234, at step 238, the CVP 115 generates ROI characteristics as part of the metadata based on an analysis of the downscaled video data retrieved from memory during step 232. During this step, the CVP 115 generates data that contains a plurality of characteristics based on one or more attributes or properties of portions of the video data within each of the ROIs. The characteristics include color histogram, vertical motion history, history of speech, polar coordinate history, and face direction history. The stream characteristics further include head segmentation and head pose estimation.

Head segmentation, which estimates the current face direction, gathers data on the angle of the person's head and face relative to the camera. For example, in one configuration, a person may be speaking to a person next to them and facing away from the nearest camera. Because the speaking person is facing away from the camera, the head segmentation would consist of a side profile view of the speaker's head and likely upper body. Thus, the side profile view is where the speaker's head and face are facing away from each camera creating a perpendicular angle between a line emanating from the center of the speaking person's face and a line tracking the shortest distance between each camera and the speaking person. Furthermore, in this configuration, the head segmentation data would likely result in the video-conferencing system 100 determining that the side profile view of the speaker is not the "best view" of the speaker. The head segmentation process is further discussed with respect to FIG. 5C.

Head pose estimation is a process by which a system estimates the future angle and location of a person's head and face in relation to the camera during normal conversational human behavior (for example, speaking, twitching, moving, or signaling). For example, a speaking person can be speaking to more than one person in the conference room, thus requiring the speaker to pan back and forth across the room. In this situation, the system would gather data determining the future angle and location of the person's head and face relative to each camera. As previously mentioned, the head and face angle of each person relative to each camera is based on a first line extending outwardly from a point in the center of each person's face (e.g., nose), with the intersection of a second line that tracks along the shortest path between each camera and the speaker. Examples of face angles can be found in FIG. 5.

In one embodiment, head pose estimation is performed using a neural network that processes images of a single head and returns estimated yaw, pitch, and roll values. In another embodiment, a neural network that processes FFOV images and produces segmentation masks of the upper body, head, and nose is later processed to obtain pitch and yaw for each person's head. In yet another embodiment, a history of head-pose estimation is used to generate angular velocity curves for yaw, pitch, and roll and predict future head poses using a Kalman filter or the Hungarian algorithm.

At step 240, system 100 sends metadata for each of the determined ROIs from the CVP 115 to the virtual cinematographer (VCT) 120, as shown by path 111 in FIG. 1. The sent metadata will include the bounding box instructions and characteristics information generated during steps 236 and 238, respectively.

FIG. 2D depicts the flow of operations for finding the best view and generating crop instructions for the best view, according to one embodiment. In step 242, the system 100 receives, at the VCT 120, region-of-interest defining metadata, or simply region defining (RD) metadata, which includes the bounding box instructions and the characteristic information. The RD metadata received from the CVP 115 includes a plurality of characteristics of video data determined during step 238. The bounding box instructions will at least include the reference coordinates/pixel locations within frames of the video data that define the outer dimensions of the ROI.

In step 244, system 100 generates a ranking of the ROIs by the VCT 120 based on the video characteristic information found in the received RD metadata. Generating a ranking of the ROI may include determining a best view for each person within a conferencing environment. The best view is based on characteristics indicative of a person participating in a conversation. The characteristic information can include a conference room participant's face size, face angle relative to a reference frame, vertical motion history, history of speech, and/or face direction history relative to a reference frame.

In step 248, system 100 generates and delivers cropping instructions based on the outcome of the steps shown in FIG. 2C. During step 248, the crop instructions allow first ISP pass 107 and the video composer 130 to create individual "people frames" for each user and/or other ROIs using the information received in the RD metadata.

Figure 8:
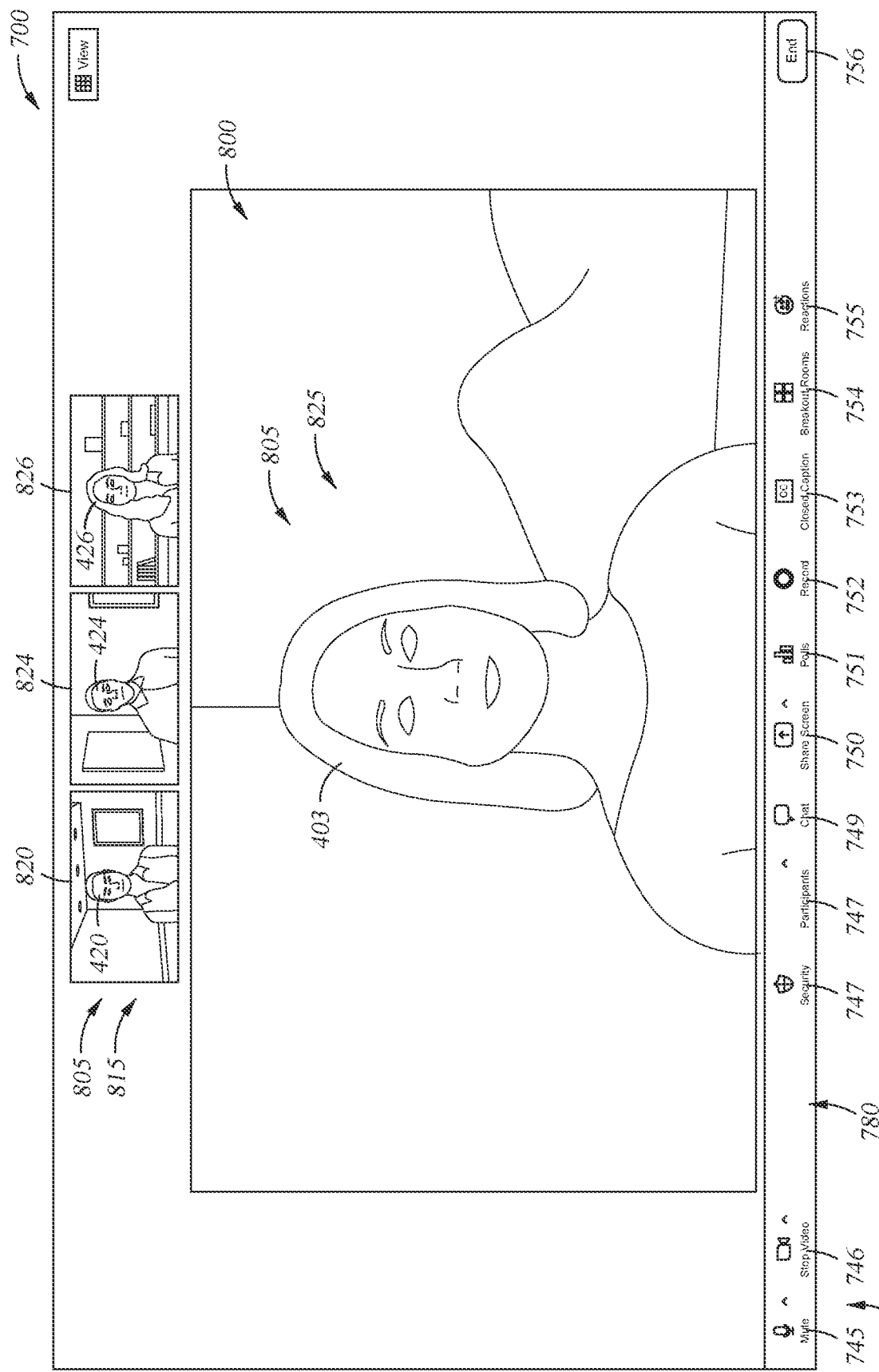
FIG. 8 depicts the composite video, according to one embodiment.
Figure 9:
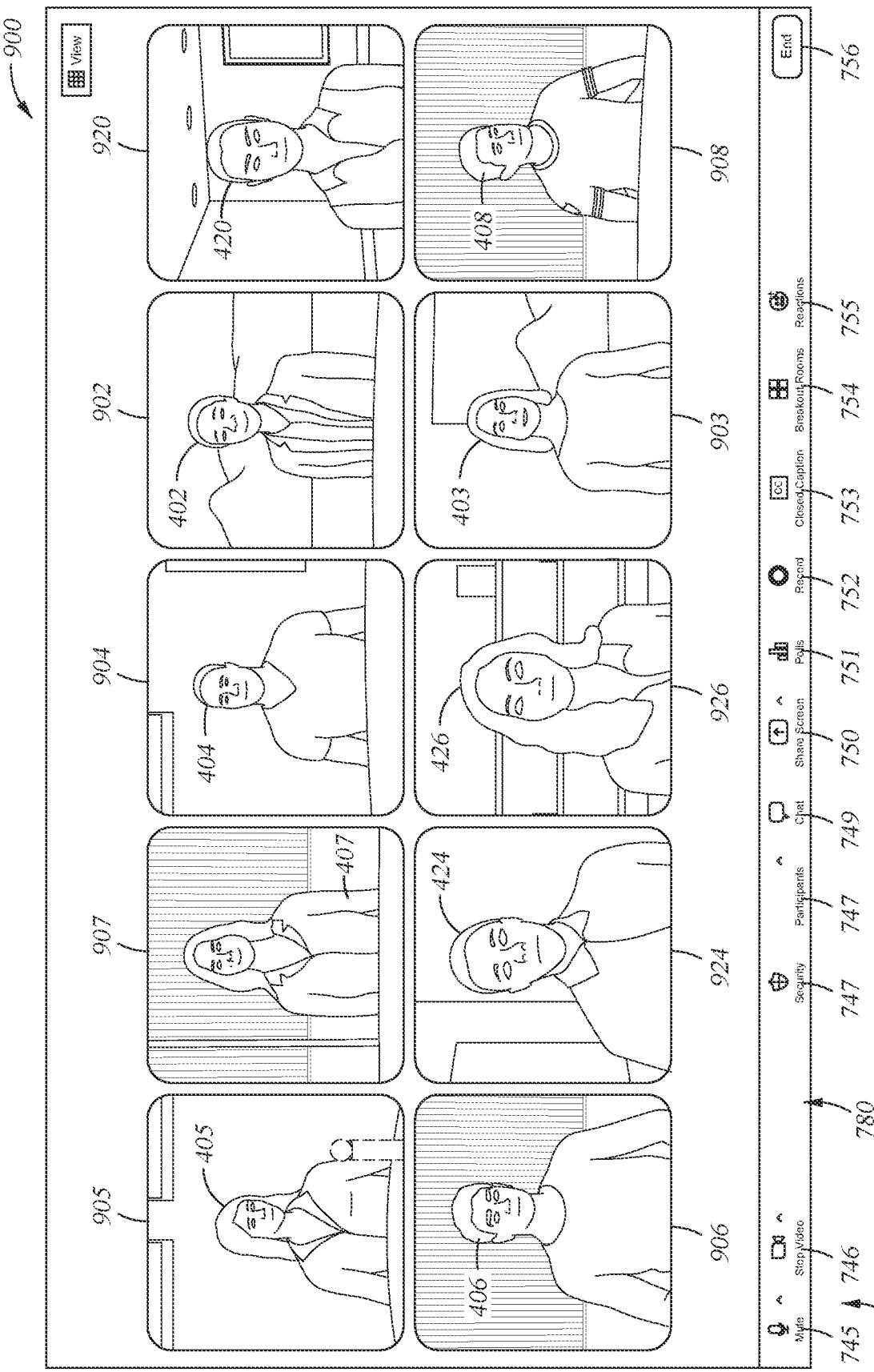
FIG. 9 depicts the composite video, according to one embodiment.

At step 248, system 100 generates cropping instructions. Here, the cropping instructions are generated by the VCT 120 and generally include cropping data relating to the portion of the video data that is to be cropped and video data that is to be retained after performing activity 266 by use of the received RD metadata. As previously mentioned, the cropping instructions are based on the ROI with the "best view," obtained in step 246 based on the sampled and downscaled video data. The cropping instructions include X and Y coordinates of the edges and/or corners of each of the bounding boxes. Typically, when the ROI includes individual "people frames," a bounding box encapsulates the person, including their face and portions of their upper body. One example of a typical bounding box dimensions is the ROIs, as depicted in FIGS. 8-10. The cropping instructions can be any instructions that are readable and executable by any general processor (e.g., a video editor, a video composer, or a plug-in cropping tool running on a SoC). The cropping instructions instruct the processor to remove any data associated with any region outside the bounding box to create a presentation ROI described further below. The cropping instructions are sent to the first ISP pass 107 and the video composer 130.

At step 250, system 100 includes sending the crop instructions to the video composer 130 (path 112 in FIG. 1) and the first ISP pass 107 (path 113). The cropping instructions are sent to the video composer 130, and the first ISP pass 107 enables a crop to be performed on the original video data, which is stored in memory.

FIG. 2E depicts a flow of operations for cropping the original video stream, according to one embodiment. In step 262, system 100 gets the crop instructions, and in step 264 retrieves the original video data from memory. In step 266, the video composer 130 crops the original video data to form one or more ROIs. The cropping process includes editing the original video data (e.g., stream of original video data) to create "video data containing ROIs" from the original video data. The video data containing ROIs are regions of the original video data that were defined by the bounding box and cropped from the original frames in the original video data, and thus include a portion of the original video data that has a resolution equal to the resolution of the original video data stored in a memory location (e.g., memory 110G, 110D, or 110F). The "video data containing ROIs" are also referred to herein as "presentation regions-of-interest," or 'presentation ROIs', since these ROIs are used as a basis for the video images that are transferred and presented at one or more internal and/or external locations during a video conference.

FIG. 2F depicts the flow of operations for an optional upscaling of the presentation ROIs, according to one embodiment. In step 272, system 100 gets the presentation ROIs optionally resizes in step 274 the presentation ROIs and/or upscales the resolution of the "presentation regions-of-interest." Step 274 can include altering the size of the portion of the original video data, which forms a presentation ROI so that the altered presentation ROI has a desired or uniform size in relation to other formed presentation ROIs. In some configurations, system 100 alters the video data, such as upscaling the video data, to meet the specifications of the final composite video stream, which is discussed further below. The video data can be upscaled using software algorithms within the second ISP pass 145. In one embodiment, the second ISP pass 145 includes using a ClearZoom Resizer to alter (e.g., resize) one or more of the generated presentation ROIs. In step 276, system 100 sends the upscaled presentation ROIs to memory.

FIG. 2G depicts the flow of operations for generating a composite scene using the cropped ROIs, according to one embodiment. In step 282, system 100 gets the presentation ROIs and generates in step 284 a final composite scene that includes two or more of the presentation ROIs. The final composite scene typically includes a plurality of presentation ROIs that may include portions of people within the conferencing environment. As depicted below in FIG. 10, the final composite video generally includes ROIs that include presentation ROIs that meet a desired dimension to look uniform from one ROI to another. In some embodiments, the ROIs have an equivalent size but do not have the same resolution due to the camera that is being used to create the region of interest, the position of the camera relative to the person found within the ROI, or other factors, which can include digital zoom related factors. In some embodiments, all of the presentation ROIs and/or altered presentation ROIs have a minimum resolution defined by one or more rules stored in memory. In some embodiments, each of the presentation ROIs has a different size. The process of forming and attributes of a formed final composite scene is further discussed in relation to FIG. 10 below.

Video Conferencing Process Flow Examples

Figure 3:
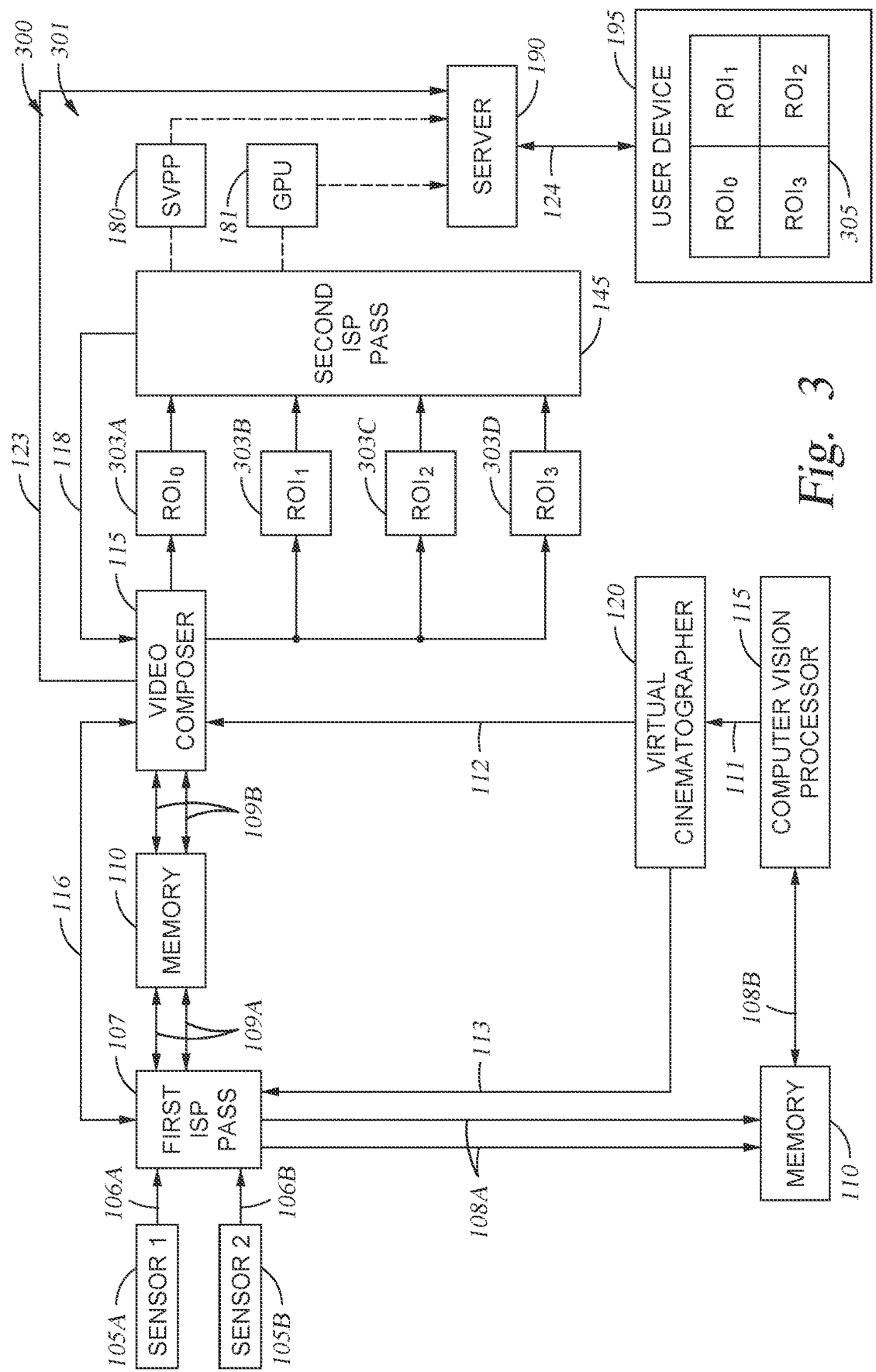
FIG. 3 depicts a block diagram in which video content is delivered to one or more internal and/or external locations, according to one embodiment.

FIG. 3 depicts a simplified block diagram of a process flow 300 that includes a plurality of ROIs that are formed from portions of either of or both of the original video data 106A and 106B provided from the sensors 105A and 105B, respectively. FIG. 3 illustrates the process of altering the video stream to create a final composite video stream with a plurality of ROIs. The process flow 300 includes the plurality of sensors 105A-105C, which can be part of the video-conferencing system 100. The image processing system 301 includes all of the components of the image processing system 101, such as the first ISP pass 107, the memory 110, the CVP 115, the virtual cinematographer 120, the video composer 130, and the second ISP pass 145. As depicted in the process flow 300, four presentation ROIs 303A-303D are created by the video composer 130, and the first ISP pass 107 from portions of the original video data 106A and/or 106B provided from the sensors 105A and/or 105B.

As previously mentioned, original video data 106A and 1066 is captured by the plurality of sensors 105A-105B. Each sensor 105A-105B is communicatively coupled to the first ISP pass 107 of the image processing system 301. The original video data 106A, 106B is thus sent to and received by the first ISP pass 107. In this example, the video data is generated from a 12-megapixel (MP) camera capable of delivering video at a 4K resolution. Each sensor 105A-105B is not limited by the size of the video data that it gathers. A first version of the original video data, 106A, 106B, is then downscaled and stored in memory 110 as sampled video data 108A. A second version of the original video data 106A is stored in memory 110. In this example, the sampled video data 108A is downscaled to a video resolution of 720p or less.

The sampled video data 108A is retrieved from memory and sent to the CVP 115. Once the VCT 120 has determined the best ROI, the VCT 120 sends crop instructions to first ISP pass 107, where multiple re-sizers in conjunction with the video composer 130 create individual presentation ROIs from the original video data 106A, 106B. The original video data is retrieved from memory 110 by the first ISP-pass 107, retrieved from memory 110 by the video composer 130, and passed between the video composer 130 and the first ISP pass 107. The video data is first altered to create a downsized portion of the ROIs by first ISP pass 107 and then sent to the video composer 130 as video data 116 to finalize the eventual creation of the presentation ROIs. In this example, the ROIs are downscaled to a 720p resolution or less to not overwhelm the processing capabilities of second ISP-pass 145 as well as to ensure a deterministic latency for the completion of the second ISP-pass 145 since the prior performed processing steps is not a significant rate limiting sequence in this process.

As depicted in FIG. 3, in this example, the presentation ROIs 303A-303D, which were determined by the VCT 120, are then sent from the video composer 130 to the second ISP pass 145, which computes additional image quality (IQ) parameters as well as resizes each ROI when appropriate using its re-sizer function. In one configuration, the re-sizer optionally upscales the video data to a desired size, such as a 2160p resolution. The resized video data is sent to the video composer 130 as video data 118. The video composer 130 then merges each presentation ROI into a single frame as a final composite display 305. In one embodiment, the composition of the final composite display 305 is determined by the video composer 130. In another embodiment, the final composite display 305 is determined by an SVPP (a general video processing hardware element, aka, a video processing unit (VPU)) or an external composition element such as a GPU. In one configuration, the final composite display is 1080p image resolution. In another configuration, the final composite display is 4K image resolution. The number of pixels transferred in the stream depends on the how the video stream is encoded.

Typically the final composite display 305 includes the one or more presentation ROIs 303A-303D. As depicted in FIG. 3, the process includes four presentation ROIs 303A-303D that have been merged into the final composite display 305. In some configurations, the final composite display 305 can include only one presentation ROI frame. The presentation ROIs can further include a portrait view of each person comprising their head, face, and a portion of their upper body. The final composite display 305 is sent to server 190 and/or to a remote video conferencing location. Typically, server 190 has memory (not shown) to store the final composite display 305. In some embodiments, the composite display is sent to another device that performs further composition tasks and then to the server and/or remote video conferencing location. In some embodiments, a client device can access the final composite display 305 in communication with the server. The client device can include a user device 195, such as a personal computer, smartphone, laptop, tablet computer etc. As depicted in FIG. 3, the user device 195 displays the final composite display 305 with the best presentation ROI for each person 303A-303D.

Figure 4A:
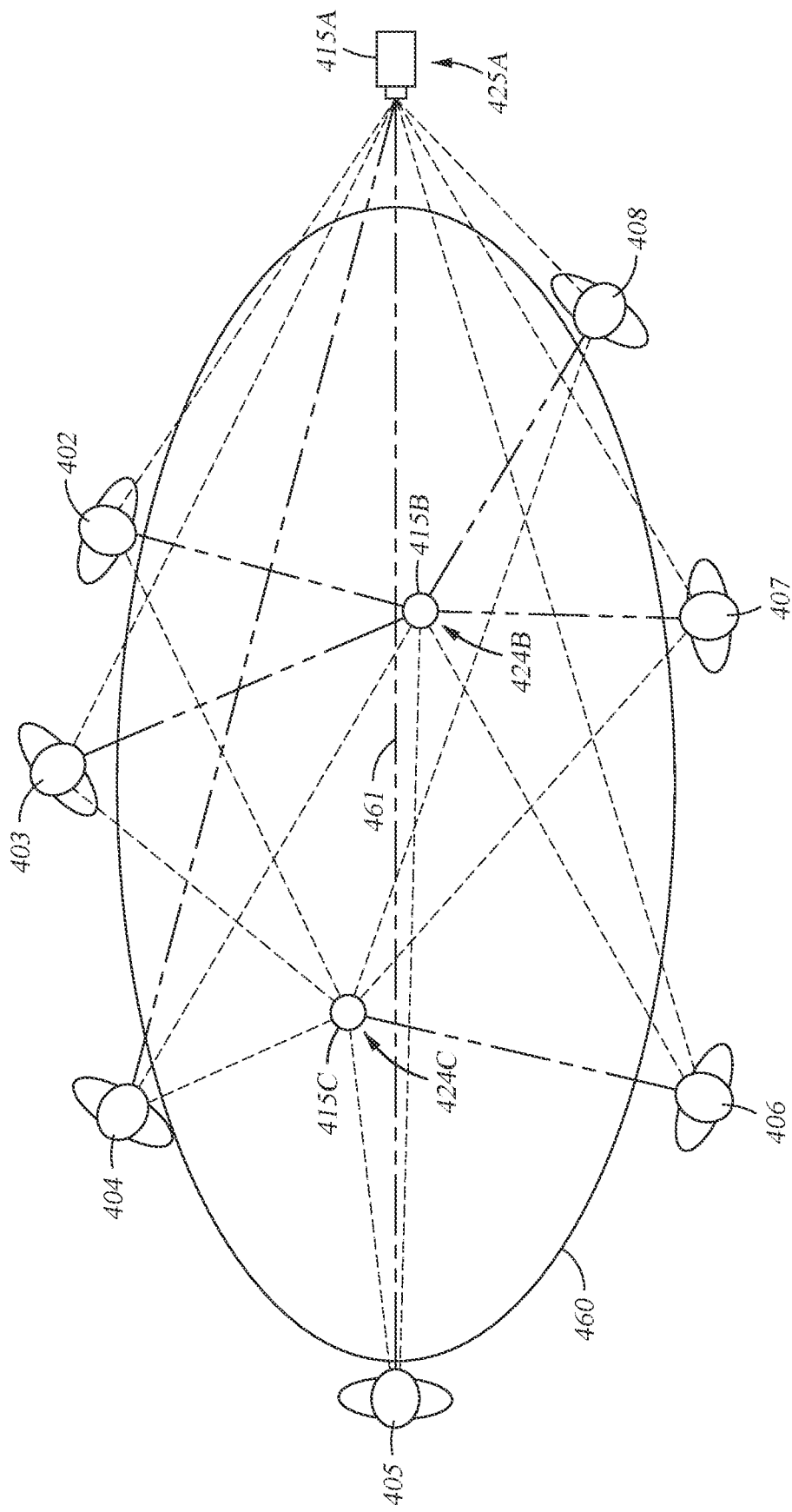
FIG. 4A depicts the sensors and their corresponding full-field-of-view (FFOV), according to one embodiment.

FIG. 4A depicts a video-conferencing system that includes a plurality of sensors and their related full field-of-views (FFOVs) according to one embodiment. FIG. 4A includes the first sensor 415A, a second sensor 4156, and a third sensor 415C. The first sensor 415A includes a first camera, the second sensor 415B includes a second camera, and the third sensor 415C includes a third camera. The figure further includes a plurality of people 402-408. The sensors 415A-415C described herein can be equivalent to or form part of the sensors 105A-105C described above. In one example, the first sensor 415A includes a front-of-the-room camera with a field of view (FOV) of 180 degrees or less, 120 degrees or less, or even 90 degrees or less. In this example, the second sensor 4156 and the third sensor 415C each have a field-of-view of 360 degrees or less, such as between about 180 degrees and 360 degrees, such as about 300 degrees. In one example, first sensor 415A includes a camera that has a field of view that is less than 180 degrees, the second sensor 4156 includes a camera that has a field of view that is greater than 180 degrees, and the third sensor 415C includes a camera that has a field-of-view that is greater than 180 degrees. The second sensor 415B and the third sensor 415C can be positioned so that their field-of-views overlap and thus allow multiple images of the desired ROI (e.g., conference room participants) in a conferencing environment, as illustrated in FIG. 4A.

Each person 402-408 in FIG. 4A is positioned around a conference table 460, which in this example is oval-shaped. The second sensor 415B and the third sensor 415C are both disposed about a central point 461 of the conference room table 460 to optimize the FFOV of each sensor. As depicted in FIG. 4A, the third sensor 415C has a FFOV that captures at least a portion of each person 402-408. The second sensor 415B has a FFOV that captures at least a portion of each person 402-408. The "best" views provided by one of the sensors 415A-415C of one of the people 402-408 are highlighted by the imaginary line that is illustrated as a double-dashed line versus the "non-best" views provided by the other sensors of that person, which are illustrated by the single dashed lines.

Figure 4B:
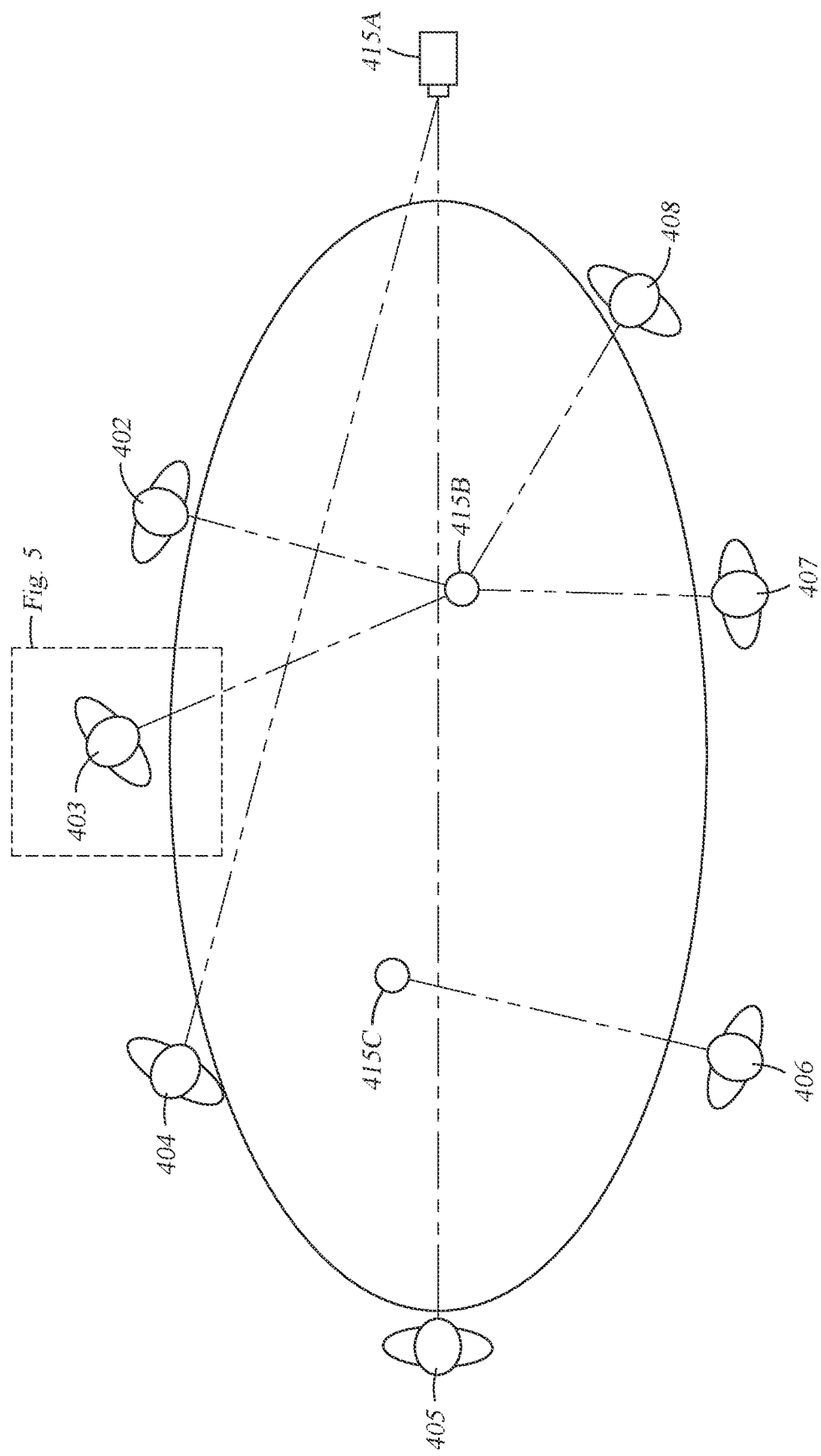
FIG. 4B depicts optimal camera angles for each person, according to one embodiment.

FIG. 4B depicts the optimal sensor 415A, 415B, or 415C for each person 402-408 based on the sensor orientations illustrated in FIG. 4A. The double-dashed lines in FIG. 4B are associated with the best view of each person 402-408 by each of the sensors 415A-415B. That is, the dashed lines illustrate which of the sensors 415A-415C provide the best view of each of the people 402-408 within the conferencing environment. Although, in this example, the dashed lines are associated with specific sensors, the best view of each person can change over time based on their seating position and the position of their upper body and face relative to each sensor. It should be noted that latency between the FFOV sensor 415A and sensor 415B or sensor 415C is closely matched to avoid video de-synchronization between the sensors or audio de-synchronization. The device processing the fewest sensors is the device that dictates the latency, meaning that a device that processes more a device with more sensors needs more processing power. Moving composition to ISP hardware helps in this case.

Figure 5:
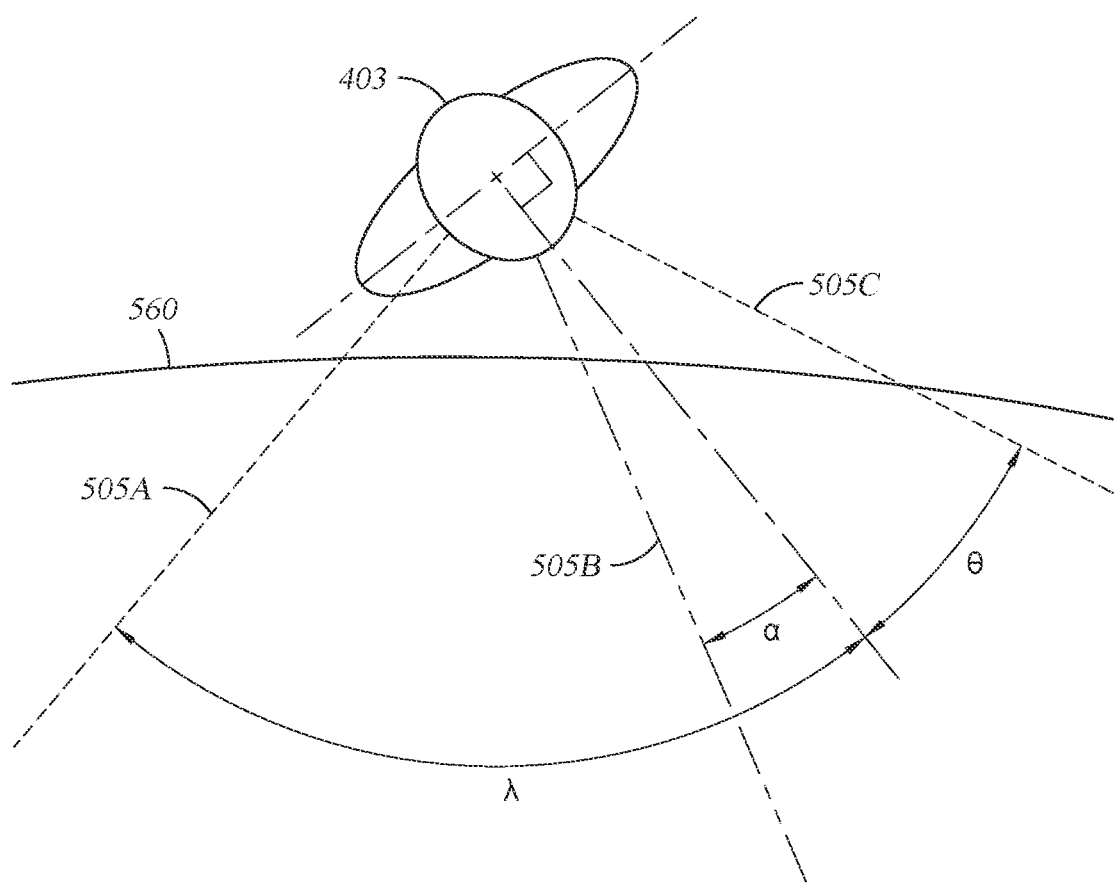
FIG. 5 depicts a face angle relative to a camera, according to one embodiment.

FIG. 5 depicts a video conference participant's face angle relative to each of the sensors 415A-415C. FIG. 5 includes a first sensor path 505A, a second sensor path 505B, and a third sensor path 505C that illustrate each sensor's 415A-415C view of the person 403 illustrated in FIGS. 4A and 4B. Each sensor path 505A, 505B, 505C tracks along an imaginary line that extends from each of the sensors 415A, 415B, 415C to the person along the shortest path between the sensor and the most outward facial feature of the person 403 in the FFOV of the sensor (e.g., nose, ear, etc.). The first sensor path 505A creates a first angle A. The second sensor path 505B creates a second angle α. The third sensor path 505C creates a third angle θ. As previously mentioned, in one configuration, the stream characteristics utilized during the flow of operations in FIG. 2C include head segmentation and head pose estimation. Head segmentation gathers data on the angle of the person's head and face relative to the sensor. Head pose estimation is a process by which a system estimates the future angle and location of a person's head and face in relation to the sensor during normal conversational human behavior (for example, speaking, twitching, moving, or signaling). For example, a speaking person can be speaking to more than one person in the conference room, thus requiring the speaker to pan back and forth across the room. In this situation, the system would gather data determining the future angle and location of the person's head and face relative to each sensor. The head segmentation data results in the video-conferencing system determining which view of the speaker is the "best view" of the speaker. As depicted in FIG. 5, the head and face angle of each person relative to each sensor can be based on a first line extending outwardly from a point in the center of each person's face (e.g., nose), with the intersection of a second line that tracks along the shortest path between each sensor and the speaker.

As depicted in FIGS. 4A, 4B, and 5, person 403 is seated in an angled orientation relative to the sensors 415A-415C, such that if sensor 415C (i.e., second central camera) were used, the sensor 415C would only capture a side profile view of person 403. Thus, the video-conferencing system 100 would have been unable to capture the front profile view of person 403 using sensor 415C. Accordingly, in this example, in this configuration, the portrait view of person 403 is best captured by the second sensor 415B. By using the FFOV of the second sensor 415B, the video-conferencing system 100 is able to generate a front profile view of speaker 403.

Using the FFOV of the second sensor 415B, the video-conferencing system prevents the user from facing a particular sensor (e.g., front-of-room camera). Turning and speaking to a sensor with an FFOV perpendicular to the speaker's face creates an unnatural speaking environment in which the speaker has to choose between facing the people in the conference room or the main sensor (e.g., front-of-room camera). By using all of the video data gathered by the first sensor 415A, the second sensor 415B, and third sensor 415C, the video-conferencing system allows the speaker (e.g., 403) to have a more natural conversation with other people (e.g., people 402, and people 404-408) in the room without having to turn away to face one specific sensor. The video-conferencing system 100 is especially helpful in allowing the speaker (person 403) to communicate directly with each member of the conference room by maintaining a traditional line of sight with each person and not turning away to face a particular sensor. Traditional video-conferencing systems that use one or more sensors require the user to continuously adjust to the sensor if the user is interested in being seen at other remote locations. The only view optimization the traditional systems typically conduct is flip-flopping between video feeds. However, as noted above, the video conferencing system 100 disclosed herein uses all of the video data gathered from the plurality of sensors 415A-415C, and determines the best view using an ROI generated by CVPs for each sensor at the ISP from the aggregate video data, thus seamlessly creating the best view of the speaker without requiring the speaker to adjust their position relative to any one sensor. Furthermore, as seen by the position of the sensors on the conference room table, the FFOV of the positions of the sensors are such that at least one of them can continuously capture the face of the speaker no matter which way they are facing. In traditional video conferencing setups, the person speaking can turn away from the one or more sensors, and thus the traditional system has no optimal view (or an optimal view that consists solely of a side profile view).

In addition, because the video conferencing system described herein aggregates the video data gathered by the sensors 415A, 415B, and 415C, the video conferencing system allows the remote viewers to view the speaker in a front profile view of their physical orientation in the room. For example, as depicted in FIG. 9, a remote user would see the front profile view of person 403 as if the person were directly facing a sensor, even though the person is facing in a perpendicular direction from the front-of-room sensor.

As previously mentioned, gathering the original video data from each sensor and determining the best view using the original video data, as commonly done in conventional systems, increases latency due to a large amount of received data and needs to be analyzed to determine the best view. Thus the process flow described herein is needed to reduce the computing power required to continuously determine the best views of each person 402-405. Furthermore, in configurations where only the speaker is shown in the final composite video 900, the processing speed becomes increasingly significant. The speaker can change more than once within a period of time, requiring the video-conferencing system to alter the displayed video to a new speaker seamlessly without a delay. Traditional process flows without downscaling and using a CVP 115, and VCT 120 have a video lag or a complete slowdown as the processing power required to process each ROI of each speaker overwhelms traditional hardware capabilities. However, as described herein, a CVP unit on each device processes the video stream, generates metadata about the people in the video streams, shares that metadata across all nodes within the system, and agrees "who is who." Each node in the system then sub-samples/crops the original video stream to be processed into a single stream. By sub-sampling/cropping the video stream, the number of pixels that have to be processed by ISP/GPU/Composing elements is reduced, reducing overall latency. In addition, because 415A may only have one camera sensor, the glass-to-glass latency is lower than 415B if 415B were to process full resolution (4 k) images from its camera modules. If this were done, there would be noticeable video de-synchronization between the ROIs from 415A and ROIs from 415B. To manage this, the above-described process sub-samples to reduce the glass-to-glass latency of 415B so that it is comparable to 415A.

Figure 6A:
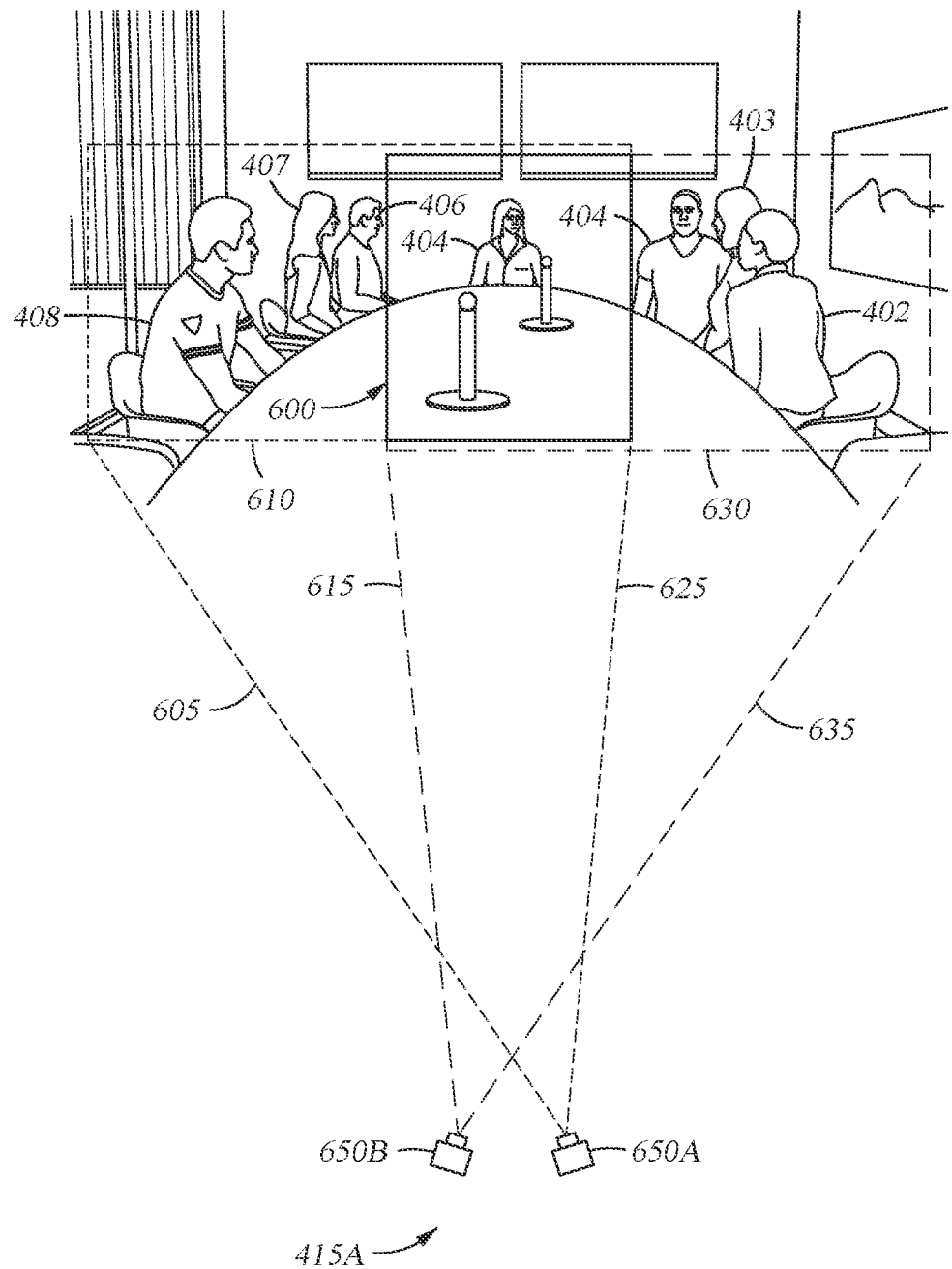
FIG. 6A depicts a full-field-of-view (FFOV) created by two sensors, according to one embodiment.

FIG. 6A depicts the FFOV from the first sensor 415A, according to one embodiment. The figure includes the first sensor 415A, and people 402-408. The first sensor 415A includes two front-of-room cameras 650A and 650B. In one configuration, the two front-of-room cameras are included in the first sensor 415A (e.g., two front-of-room cameras). Each front-of-room camera includes a first FFOV 610 and a second FFOV 630. The first front-of-room camera 650A has a first FFOV 610, and the second front-of-room camera 650B has a second FFOV 630. The first FFOV 610 includes a first left FFOV edge 615 and a first right FFOV edge 625. The second FFOV 630 includes a second left FFOV edge 605 and a second right FFOV edge 625. The first left FFOV edge 615 and the first right FFOV edge 625 create a left and the right edge regions of a stitched view 600. The stitched view 600 includes portions of the first FFOV 610 and the second FFOV 630. In some embodiments, the first FFOV 610 and the second FFOV 630 are stitched together in a GPU or VPU using a general video stitching algorithm found in smartphones for panoramic photos.

Figure 6B:
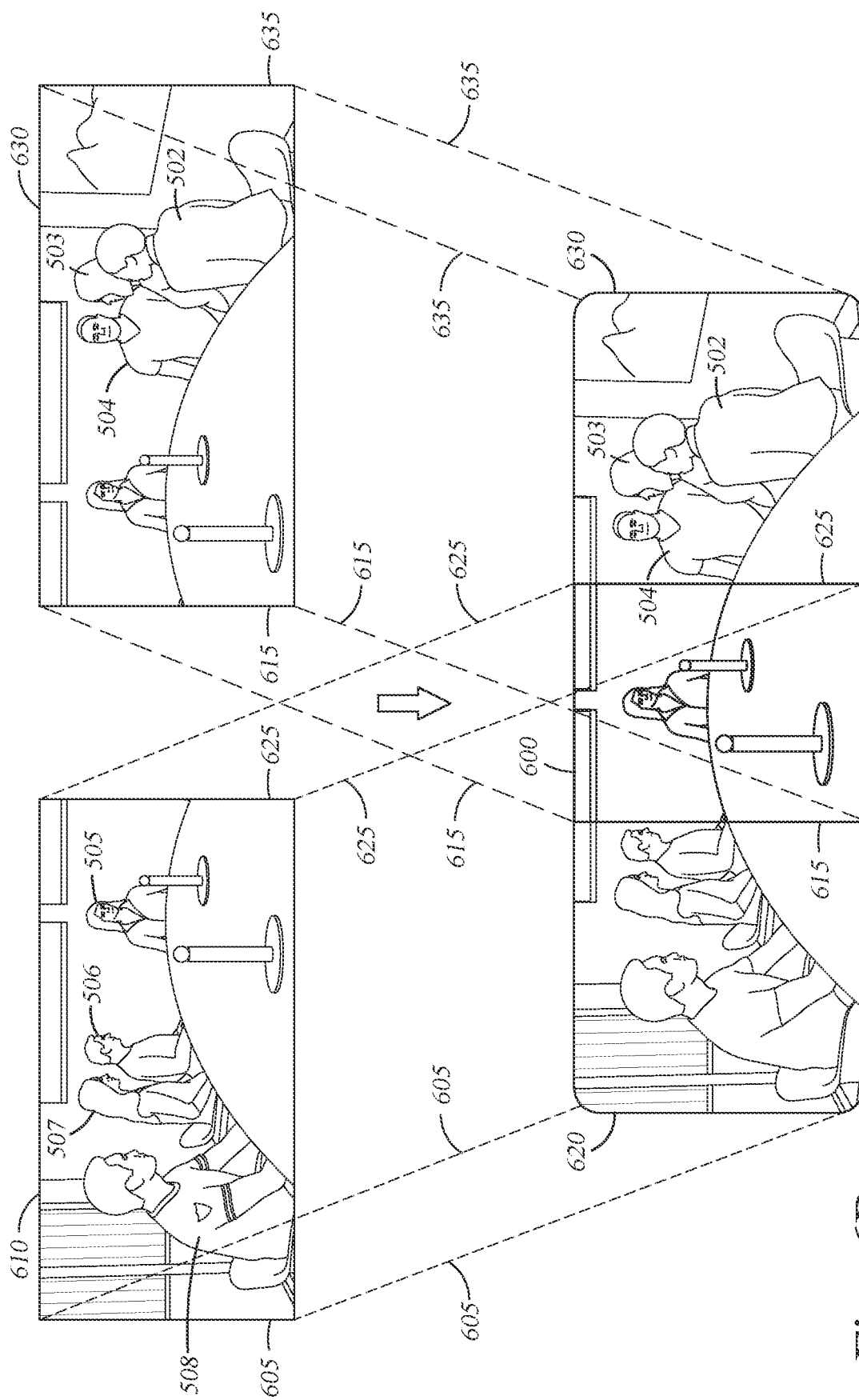
FIG. 6B depicts separate views generated from the two sensors depicted in FIG. 6A and a stitched view generated from the two separate views, according to one embodiment.

FIG. 6B depicts an illustration of the exploded FFOV from sensor 415A according to one embodiment. The exploded view from sensor 415A includes the first FFOV 610 from the first sensor 650A and the second FFOV 630 from the second sensor 650B. As depicted in FIG. 6B, the first FFOV 610 and the second FFOV 630 are eventually combined (i.e., stitched) together to create the stitched view 600, which contains portions of an overlapping section (e.g., dark outlined box in FIG. 6A) that surrounds the person 505 and additional portions that are outside of the overlapping section of the video data generated by each of the sensors 650A and 650B. In one embodiment, during the stitching process, the VCT 120 ranks the ROIs in the first FFOV 610 and the second FFOV 630, which is created based on the overlapping section surrounding person 505 in the first FFOV 610 and the second FFOV 630 and then selects the "best view" of the person 505 to create a presentation ROI from either the video data provided by the first sensor 415A or second sensor 415B. In this example, the bounding box portion of the ROIs in the first FFOV 610 and the second FFOV 630 are defined by the dark outlined box in FIG. 6A. In some embodiments, the second ISP pass then utilizes the presentation ROI created from one of the FFOVs and stitches the remaining non-overlapping portion found in the other FFOV with the FFOV containing the presentation ROI to form the stitched view 600. Image stitching is performed by assuring that two cameras are calibrated, and some algorithm is used to compute common features from each camera and measure the difference between them so that a seam at which the stitching of the feeds from each camera can occur at the seam.

Figure 7:
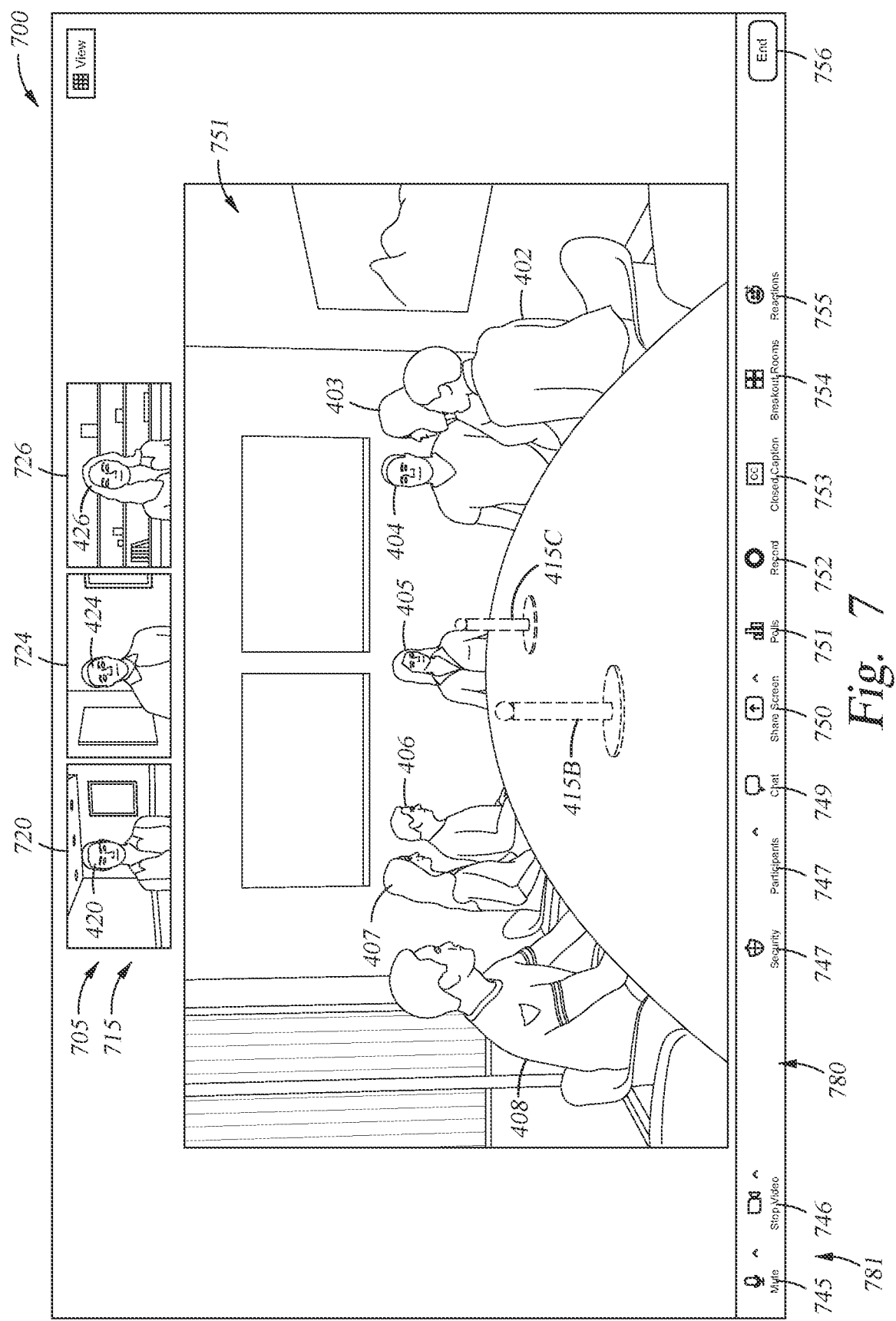
FIG. 7 depicts a composite video in a traditional video conferencing environment.

FIG. 7 depicts a video conferencing user interface 700 that includes presentation ROIs and an overall image of the video conferencing environment depicted in FIGS. 4A-4B using the sensors 415A-415C found therein. The video conferencing user interface 700 includes one or more portrait views 715 of the remote video conferencing participants 705, a full field-of-view 751 of the conference room from a front-of-room sensor (i.e., sensor 415A of FIGS. 4A-4B), and a toolbar 780. The one or more portrait views of the remote video conferencing participants 705 include people 420, 424, 426 that are disposed within the presentation ROIs 720, 724, 726, respectively. The FFOV 751 of the conference room includes people 402-408, as depicted in FIGS. 4A-4B. The toolbar 780 includes one or more video conferencing tools 781. The one or more video conferencing tools 781 include a mute feature 745, a stop video feature 746, a security feature 747, a participant feature 748, a chat feature 749, a share screen feature 750, a poll feature 751, a record feature 752, a closed caption feature 753, a breakout room feature 754, a reaction feature 755, and an end call feature 756. The video conferencing user interface is accessed through a user device such as a personal computer, smartphone, tablet, etc.

In traditional video conferencing configurations, the FFOV 751 captured by a single front-of-room sensor is the only view of the conference room environment. The traditional FFOV 751 of the conference room typically does not include the second sensor 415B and the third sensor 415C. In most cases, traditional front-of-room cameras only capture a front portrait view of the people facing the sensor. As depicted in the FFOV 751, only persons 405 and 404 face the sensor 415A. Thus, in this position, only the two forward-facing people 404 and 405 have a front portrait view (e.g., a forward-facing view of the speaker's head and upper body). People 402-403 and 406-408 have only a side profile view. In this seating arrangement of people 402-408, there is no way for the front-of-room sensor to capture a portrait view of people 402-403 and people 406-408. In FIG. 7, people 720, 724, and 726 have a portrait view of their full face and upper body. Thus, when the front-of-room sensor isolates each person in the FFOV in the conference room, it cannot provide the portrait view of people 720, 724, and 726 for people 408, 407, 406, 403, and 402.

FIG. 8 depicts the video conferencing user interface 800 according to one embodiment. In this embodiment, the video conferencing user interface 800 includes the one or more portrait views 815 of the remote video conferencing participants 805 and a front portrait view of the preferred speaker 805, which is created from the FFOV of sensor 415B's view of person 403 in FIGS. 4A and 4B. The remote video conferencing participants illustrated in the video conferencing user interface 800 include people 820, 824, 826. Furthermore, as previously mentioned, that conference room is not limited to persons 402-408 and can include more or fewer people. As discussed above, the video-conferencing system described herein determines which speaker is the "preferred speaker" 805 by using algorithms running on one or more components within the system 100. In this configuration, one or more people 402-408 can be speaking, and the system is tasked with determining which speaker is the "preferred speaker." A preferred speaker 805 is a video conference participant actively participating in a conversation within the video conferencing environment. The preferred speaker is determined by the virtual cinematographer using the ROI characteristics previously mentioned, and the generated bounding box instructions are used as a basis to finally form the presentation ROI, which has a reduced video data size as discussed herein. The preferred speaker 805 can be continuously updated to include any person present in the conference room. For example, person 408 may begin to speak, at which point that person becomes the preferred speaker, and the sensor with the best view captures an ROI within the video data associated with person 408. However, if person 408 stops speaking or takes a break in the conversation, and person 402 begins speaking, the video-conferencing system 100 changes the profile view of the speaker 825 to show the "best view" of person 402. Furthermore, if person 408 and person 402 are talking at the same time, and the system 100 is configured to only display one "preferred speaker" 805 on the final composite interface, the VC 120 uses the one or more ROI characteristics to determine which speaker is the preferred speaker 805. For example, the VC 120 can use the speech history of each person to determine which person has spoken longer. In this example, the VC 120 determines that the person who has spoken longer is the preferred speaker. Alternatively, the VC 120 is adjusted to allow the speaker with a shorter speaking history to speak. The sensitivity to any of the ROI characteristics that the VC 120 relies on can be continuously adjusted, as it may be determined that one-off sounds or actions may be significant enough to require the preferred speaker 825 to change. For example, one person 403 may move a hand or make a slight sound that the VC 120 determines does not elevate to a level necessary to switch the preferred speaker from one of person 402 or 404-408 to person 403.

In this example, sensors 415A-415C capture original video data 106A-106C. Original video data 106A is associated with sensor 415A. Original video data 106B is associated with sensor 415B. Original video data 106C is associated with sensor 415C. The original video data 106A-106C captured from each sensor 415A-415C is passed to the first ISP pass 107. The video data 106A-106C is sampled (i.e., downscaled) at the first ISP pass 107. The downscaled video data 108A-108C is stored in memory 110. The CVP 115 then retrieves the downscaled video data 108A-108C from memory. As previously mentioned, the CVP 115 determines the ROI (bounded by a bounding box) for each person and generates metadata associated with each ROI. The metadata, including bounding box instructions, is sent to the VCT 120. The metadata is shown as 111 in FIG. 1. The VCT 120 then determines the best ROI for each person and sends cropping instructions to the video composer 130 and first ISP-pass 107. In this configuration, the VCT 120 is programmed to display only a "preferred speaker." After determining the best ROI for each person, the VCT 120 then determines (using the metadata) which person 402-408 is the preferred speaker. Once the best ROI of the preferred speaker is compiled, it can be sent to the video conferencing server 190, where it can be retrieved by a viewer's device 195.

FIG. 9 depicts the final composite video 900, created using the sensors 415A-415C in FIGS. 4A and 4B. In this embodiment, the final composite video 900 includes profile views of people 402-408 and remote users 920, 922, and 924. Each person 402-408 of the conference room is given a profile view regardless of whether or not they are speaking. In this configuration, the FFOV of each person 402-408 is not limited to the preferred speaker 805 illustrated in FIG. 8. System 100 creates a portrait view for each person 402-408 based on the best view of each person 402-408 in the conference room. FIGS. 4A and 4B show that the videoconferencing system 100 is able to capture any person 402-408, which can then be formed into a composite scene, as shown in FIGS. 8 and 9. The final composite video 900 includes a final composite display 305 in FIG. 3 created by forming the one or more presentation ROIs, as described herein. The final composite display 305 is then sent to the video conferencing server 190 to be retrieved by the client viewer's device 195 in FIG. 3.

The image processing system 101, which is configured to implement the various methods described above, can include or utilize a personal computing device, e.g., a desktop or laptop computer, configured with hardware and software that a user may employ to engage in routine computer-related activities, such as video conferencing activities. In some embodiments, the image processing system 101 can include a SoC that generally includes a processor, memory, and a peripherals interface. The processor may be any one or combination of a programmable central processing unit (CPU), a graphics processing unit (GPU), a digital signal processor (DSP), a video signal processor (VSP) that is a specialized DSP used for video processing, a field programmable gate array (FPGA), an application-specific integrated circuit (ASIC), a neural network coprocessor, or other hardware implementation(s) suitable for performing the methods set forth herein, or portions thereof.

The memory, coupled to the processor, is non-transitory and represents any non-volatile memory of a size suitable for storing one or more software applications, video data, metadata, and other types of data described herein. Examples of suitable memory may include readily available memory devices, such as random access memory (RAM), flash memory, a hard disk, or a combination of different hardware devices configured to store data.

The peripherals interface is configured to facilitate the transfer of data between the various video conferencing devices and one or more of the plurality of peripheral devices that are integrated with or are disposed in wired or wireless communication with the sensors and other connected electronic devices within the video conferencing system. The peripherals interface may include one or more USB controllers and/or may be configured to facilitate one or more wireless communication protocols that may be used may include, but are not limited to Bluetooth, Bluetooth low energy (BLE), Infrastructure Wireless Fidelity (Wi-Fi), Soft Access Point (AP), WiFi-Direct, Address Resolution Protocol (ARP), ANT UWB, ZigBee, Wireless USB, or other useful personal area network (PAN), wide area network (WAN), local area network (LAN), wireless sensor network (WSN/WSAN), near field communication (NFC) or cellular network communication protocols.

It is believed that the system and methods provided herein provide significant advantages over traditional methods that include numerous process bottlenecks that increase the latency of a video stream. Traditional methods do not sample video stream data to determine which portions of the video data should be kept (and subsequently compiled) and which portions should be discarded. By discarding the irrelevant portions of the original video data, the systems described herein can increase processing speed by requiring the system to perform less work. Specifically, by downscaling the original video data using the CVP 115 and the VCT 120, the systems described herein determine which portions of original video data contain the best view of each speaker with minimal latency and desirable video quality. In general, all other unwanted or unnecessary video data is removed prior to starting the heavy computing task of compiling (e.g., composing) the video. In addition, other image processing task such as noise reduction and color tuning on the video increases the computing requirements as the number of pixels increases.

Unlike the disclosed system and methods provided herein, traditional systems and methods downscale the entire video data before determining what portion of the video data needs to be further processed before the processed video data is delivered to a desired location within a video conferencing environment. Furthermore, traditional methods do not have parallel processing schemes, where a small portion of the original video data is downscaled, and the original video data is unaltered until later in the process of generating the desired video stream. Thus, traditional methods include bottlenecks, where the original video data is downscaled to a new downscaled video data size, then analyzed as downscaled video data, then upscaled back to an original (or greater) video data, and then compiled to form an altered set of video data.

Any downscaled megapixels need to be subsequently upscaled if any regions of interest are found. This upscaling is especially computationally intensive since all data from a camera is compressed without any vetting to find the desired ROIs. Downscaling and upscaling associated with this traditional process flow results in a larger latency. Downscaling the video data without affecting the original video data removes the need for the processing elements within a system-on-a-chip (SoC) to downscale the original video data only to later re-scale the video data after the ROI have been determined.

The system and methods described herein, therefore, remove the need for downscaling all of the original video data to perform various "best" or "preferred" view types of analyses on the video data, saving computing power and instead only altering the original video data to remove unwanted portions of video data thus speeding up the process of compiling multiple high-resolution images. The downscaling allows the system to determine the ROI and create cropping instructions for altering the original high-resolution video stream data received from the sensors 105A-105C and stored in memory (i.e., 110B, 110D, and 110F) without ever having to re-scale the original video stream data. Furthermore, in some configurations, the original video data need not be re-scaled after the individual ROIs are formed.

The methods, systems, and devices described herein collectively provide a multi-camera video conferencing system and video conferencing method that allows each individual speaker to be viewed in a desired manner regardless of their seating or speaking position, and also a multi-camera video conferencing system that has a low latency, while also maintaining or providing high-quality images to one or more video conference locations.

While the foregoing is directed to embodiments of the present disclosure, other and further embodiments of the disclosure may be devised without departing from the basic scope thereof, and the scope thereof is determined by the claims that follow.

What is claimed is:

1. A method of video conferencing, comprising:
processing a video stream received from each of a plurality of sensors, wherein each video stream includes a first version of video data having a first resolution, and processing the video stream comprises:
sampling the first version of the video data to form a second version of the video data, wherein the second version of the video data has a second resolution that is less than the first resolution;
determining one or more regions of interest within the second version of the video data, and
generating metadata for each of the one or more regions of interest;
generating cropping instructions for each of the one or more regions of interest based on the metadata;
removing portions of the first version of the video data based on the cropping instructions; and
generating a composite display that includes portions of the first version of the video data remaining after removing portions from the first version of video data.

2. The method of claim 1, further comprising determining a preferred speaker captured within the video stream based on the metadata.

3. The method of claim 2, further comprising generating cropping instructions for a region of interest that includes the preferred speaker.

4. The method of claim 3, further comprising removing portions of the first version of the video data outside the region of interest that includes the preferred speaker.

5. The method of claim 1, wherein the plurality of sensors comprise:
a first camera that has a field-of-view that is greater than 180 degrees;
a second camera that has a field-of-view that is greater than 180 degrees; and
a third camera that has a field-of-view that is less than 180 degrees.

6. The method of claim 1, wherein
the metadata includes bounding box instructions, and
the bounding box instructions include information relating to pixel coordinates that define the one or more regions of interest.

7. The method of claim 6 wherein the metadata further includes data for at least one of face size, face angle, vertical motion history, history of speech, and face direction history.

8. A video conferencing system comprising:
a plurality of sensors that are each configured to generate a video stream that comprises a first version of video data that has a first resolution;
an image signal processor that is configured to downscale the first version of the video data to form a second version of the video data that has a second resolution that is less than the first resolution;
a computer vision processor that is configured to determine two or more regions of interest and generate metadata for each of the two or more regions of interest using the second version of the video data;
a virtual cinematographer configured to:
create a ranking of the determined two or more regions of interest based on the metadata;
generate crop instructions for each of the two or more regions of interest based on the metadata and the ranking of each of the one or more regions of interest; and
crop at least two or more portions of the first version of the video data to form at least two or more presentation regions of interest; and
a video composer configured to compile the at least two or more presentation regions of interest.

9. The system of claim 8, further including a second image signal processor configured to upscale the presentation regions of interest.

10. The system of claim 8, wherein the plurality of sensors comprise:
a first camera that has a field-of-view that is greater than 180 degrees;
a second camera that has a field-of-view that is greater than 180 degrees; and
a third camera that has a field-of-view that is less than 180 degrees.

11. The system of claim 8, wherein the two or more presentation regions of interest are based on a ranking of the two or more presentation regions of interest being higher than other regions of interest in the second version of the video data.

12. The system of claim 8, wherein the metadata includes data for face angle, color histogram, vertical motion history, history of speech, polar coordinate history, and face direction history.

13. The system of claim 8, wherein the computer vision processor is further configured to perform at least one of the following:
- generate a bounding box;
- determine a face angle;
- generate a color histogram;
- generate vertical motion history;
- determine a history of speech;
- determine polar coordinates;
- generate face direction history; and
- issue unique identifiers for each video stream.

14. A method of video conferencing, the method comprising:
- processing a video stream received from each of a plurality of sensors, wherein each video stream includes a first version of video data having a first resolution, and processing the video stream comprises:
- sampling the first version of the video data to form a second version of the video data, wherein the second version of the video data has a second resolution that is less than the first resolution;
- determining one or more regions of interest within the second version of the video data;
- generating metadata for each of the one or more regions of interest;
- selecting one or more regions of interest as best by ranking each of the one or more regions of interest determined in the second version of the video data based on the metadata;
- generating cropping instructions for each of the one or more regions of interest selected as best based on the metadata;
- cropping at least two or more portions of video data from the first versions of the video to form two or more presentation regions of interest based on the cropping instructions; and
- generating a composite scene video data that includes the two or more presentation regions of interest.

15. The method of claim 14, wherein ranking each of the one or more regions of interest includes assigning a value to a face angle, color histogram, vertical motion history, history of speech, polar coordinate history, and face direction history of each person.

16. The method of claim 14, wherein the metadata includes bounding box instructions that include information relating to pixel coordinates that define the one or more regions of interest.

17. The method of claim 14, wherein the two or more presentation regions of interest are based on a ranking of the two or more presentation regions of interest being higher than other regions of interest in the second version of the video data.

18. The method of claim 14, further comprising determining a preferred speaker based on the metadata, wherein at least one of the two or more presentation regions of interest include the preferred speaker.

19. The method of claim 14, wherein the plurality of sensors comprise:
- a first camera that has a field-of-view that is greater than 180 degrees;
- a second camera that has a field-of-view that is greater than 180 degrees; and
- a third camera that has a field-of-view that is less than 180 degrees.

20. The method of claim 14, wherein generating a composite scene video includes stitching together the two or more presentation regions of interest.

* * * * *